(12) United States Patent
Park et al.

(10) Patent No.: US 12,436,575 B2
(45) Date of Patent: Oct. 7, 2025

(54) ELECTRONIC DEVICE COMPRISING MAGNET ARRAY

(71) Applicant: Samsung Electronics Co., Ltd., Suwon-si (KR)

(72) Inventors: Sangil Park, Suwon-si (KR); Myeongsil Park, Suwon-si (KR); Juwan Park, Suwon-si (KR); Hyein Park, Suwon-si (KR); Jaehyoung You, Suwon-si (KR); Shinhyuk Yoon, Suwon-si (KR); Jaedeok Lim, Suwon-si (KR); Gyuyeong Cho, Suwon-si (KR); Seungbum Choi, Suwon-si (KR); Hyunju Hong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 192 days.

(21) Appl. No.: 18/149,497

(22) Filed: Jan. 3, 2023

(65) Prior Publication Data

US 2023/0140971 A1 May 11, 2023

Related U.S. Application Data

(63) Continuation of application No. PCT/KR2021/008522, filed on Jul. 5, 2021.

(30) Foreign Application Priority Data

Jul. 16, 2020 (KR) .................. 10-2020-0087967
Mar. 17, 2021 (KR) .................. 10-2021-0034707

(51) Int. Cl.
*G06F 1/16* (2006.01)
*H01F 7/02* (2006.01)

(52) U.S. Cl.
CPC .......... *G06F 1/1679* (2013.01); *G06F 1/1652* (2013.01); *G06F 1/1656* (2013.01);
(Continued)

(58) Field of Classification Search
None
See application file for complete search history.

(56) References Cited

U.S. PATENT DOCUMENTS

2008/0186683 A1* 8/2008 Ligtenberg ............ G06F 1/1616
335/207
2016/0240966 A1 8/2016 Szeto
(Continued)

FOREIGN PATENT DOCUMENTS

CN 105446428 A 3/2016
CN 207184560 U 4/2018
(Continued)

OTHER PUBLICATIONS

International Search Report dated Oct. 8, 2021, issued in International Patent Application No. PCT/KR2021/008522.
(Continued)

*Primary Examiner* — Allen L Parker
*Assistant Examiner* — Christopher L Augustin
(74) *Attorney, Agent, or Firm* — Jefferson IP Law, LLP

(57) ABSTRACT

An electronic device is provided. The electronic device includes a foldable housing which has a hinge structure including a first housing and a second housing, the first housing is connected to the hinge structure and includes a first surface facing a first direction, a second surface facing a second direction opposite the first direction, and a first side surrounding the space between the first second surface, and the second housing is connected to the hinge structure and includes a third surface facing a third direction, a fourth surface facing a fourth direction opposite the third direction, (Continued)

and a second side, the first surface facing the third surface when the electronic device is in a folded state, and the third direction being the same as the first direction when the electronic device is in an unfolded state, a flexible display extending from the first and third surface, and a magnet array.

20 Claims, 28 Drawing Sheets

(52) U.S. Cl.
CPC .......... *G06F 1/1681* (2013.01); *H01F 7/0278* (2013.01); *G06F 1/1616* (2013.01)

(56) References Cited

U.S. PATENT DOCUMENTS

| | | | |
|---|---|---|---|
| 2017/0102738 A1* | 4/2017 | Park | G06F 3/04883 |
| 2017/0208157 A1* | 7/2017 | Kim | H04M 1/0268 |
| 2018/0364761 A1 | 12/2018 | Lin et al. | |
| 2019/0164675 A1 | 5/2019 | Srinivasan et al. | |
| 2019/0200470 A1* | 6/2019 | Woo | G06F 1/1679 |
| 2020/0267861 A1 | 8/2020 | Kim | |

FOREIGN PATENT DOCUMENTS

| | | |
|---|---|---|
| CN | 106355996 B | 5/2019 |
| CN | 110176188 A | 8/2019 |
| CN | 111131568 A | 5/2020 |
| CN | 211018878 U | 7/2020 |
| KR | 10-2011-0014829 A | 2/2011 |
| KR | 10-0475554 Y1 | 12/2014 |
| KR | 10-2017-0086369 A | 7/2017 |
| KR | 10-1794445 B1 | 11/2017 |
| KR | 10-1851266 B1 | 4/2018 |
| KR | 10-2019-0013069 A | 2/2019 |

OTHER PUBLICATIONS

Extended European Search Report dated Nov. 8, 2023, issued in European Patent Application No. 21842221.0.
Indian Office Action dated Sep. 2, 2024, issued in Indian Application No. 202347009578.

* cited by examiner

ELECTRONIC DEVICE COMPRISING MAGNET ARRAY

CROSS-REFERENCE TO RELATED APPLICATION(S)

This application is a continuation application, claiming priority under § 365(c), of an International application No. PCT/KR2021/008522, filed on Jul. 5, 2021, which is based on and claims the benefit of a Korean patent application number 10-2020-0087967, filed on Jul. 16, 2020, in the Korean Intellectual Property Office, and of a Korean patent application number 10-2021-0034707, filed on Mar. 17, 2021, in the Korean Intellectual Property Office, the disclosure of each of which is incorporated by reference herein in its entirety.

BACKGROUND

1. Field

The disclosure relates to an electronic device including a magnet array.

2. Description of Related Art

Advancing information communication technology and semiconductor technology accelerate the spread and use of various electronic devices. In particular, recent electronic devices are being developed to carry out communication while being carried. Further, electronic devices may output stored information as voices or images. As electronic devices are highly integrated, and high-speed, high-volume wireless communication becomes commonplace, an electronic device, such as a mobile communication terminal, is recently being equipped with various functions. For example, an electronic device comes with the integrated functionality, including an entertainment function, such as playing video games, a multimedia function, such as replaying music/videos, a communication and security function for mobile banking, and a scheduling and e-wallet function. Such electronic devices become compact enough for users to carry in a convenient way.

As mobile communication services extend up to multimedia service sectors, the display of the electronic device may be increased to allow the user satisfactory use of multimedia services as well as voice call or text messaging services. Accordingly, a foldable display may be disposed on the entire area of the housing structure separated to be foldable.

The above information is presented as background information only to assist with an understanding of the disclosure. No determination has been made, and no assertion is made, as to whether any of the above might be applicable as prior art with regard to the disclosure.

SUMMARY

Electronic devices may receive various inputs from a user through a specific input device (e.g., a stylus pen) connected with the electronic device via wireless communication. The electronic device may identify the position on the electronic device designated by the input device and perform the function corresponding thereto. For example, the electronic device may detect the magnetic field generated from the input device using electro magnetic resonance (hereinafter, referred to as EMR) scheme.

When a foldable electronic device is folded, a gap may be formed between the separated housings of the electronic device by the repulsive force. To reduce the gap, magnets may be disposed at two opposite ends of the separated housings. However, the area available to the input device using the electromagnetic induction scheme may be reduced due to the magnetic field generated from the magnet.

Aspects of the disclosure are to address at least the above-mentioned problems and/or disadvantages and to provide at least the advantages described below. Accordingly, an aspect of the disclosure is to provide an electronic device capable of reducing the magnitude of the magnetic field transferred to the input device, using a magnet array having a designated array.

The disclosure is not limited to the foregoing embodiments but various modifications or changes may rather be made thereto without departing from the spirit and scope of the disclosure.

Additional aspects will be set forth in part in the description which follows and, in part, will be apparent from the description, or may be learned by practice of the presented embodiments.

In accordance with an aspect of the disclosure, an electronic device is provided. The electronic device includes a foldable housing including a hinge structure, the foldable housing including a first housing connected to the hinge structure and including a first surface facing in a first direction, a second surface facing in a second direction opposite to the first direction, and a first side surface surrounding at least a portion between the first surface and the second surface and a second housing connected to the hinge structure and including a third surface facing in a third direction, a fourth surface facing in a fourth direction opposite to the third direction, and a second side surface surrounding at least a portion between the third surface and the fourth surface, in a folded state, the first surface facing the third surface and, in an unfolded state, the third direction being the same as the first direction, a flexible display extending from the first surface to the third surface, and a magnet array including a plurality of magnets in a three-dimensional multipolar magnetic array, the magnet array including a first magnet array disposed in the first housing and a second magnet array disposed in the second housing. In the folded state, the first magnet array may correspond to the second magnet array.

In accordance with another aspect of the disclosure, an electronic device is provided. The electronic device includes a foldable housing including a hinge structure and including a first housing connected to the hinge structure and a second housing connected to the hinge structure and rotatable about the hinge structure from the first housing, a flexible display extending from the first housing to the second housing, and a plurality of magnets in a three-dimensional multipolar magnetic array and includes a first magnet array disposed in the first housing, a magnetic substance disposed in the second housing and having at least a portion facing at least a portion of the first magnet array in a folded state of the electronic device, and a guide member disposed on the first magnet array.

In accordance with another aspect of the disclosure, the electronic device is provided. The electronic device includes a magnet array having a designated array. Accordingly, the direction of the magnetic field may be deviated, so that the magnitude of the magnetic field for reducing gap may increase while the magnitude of the magnetic field transferred to the display area of the display may reduce.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
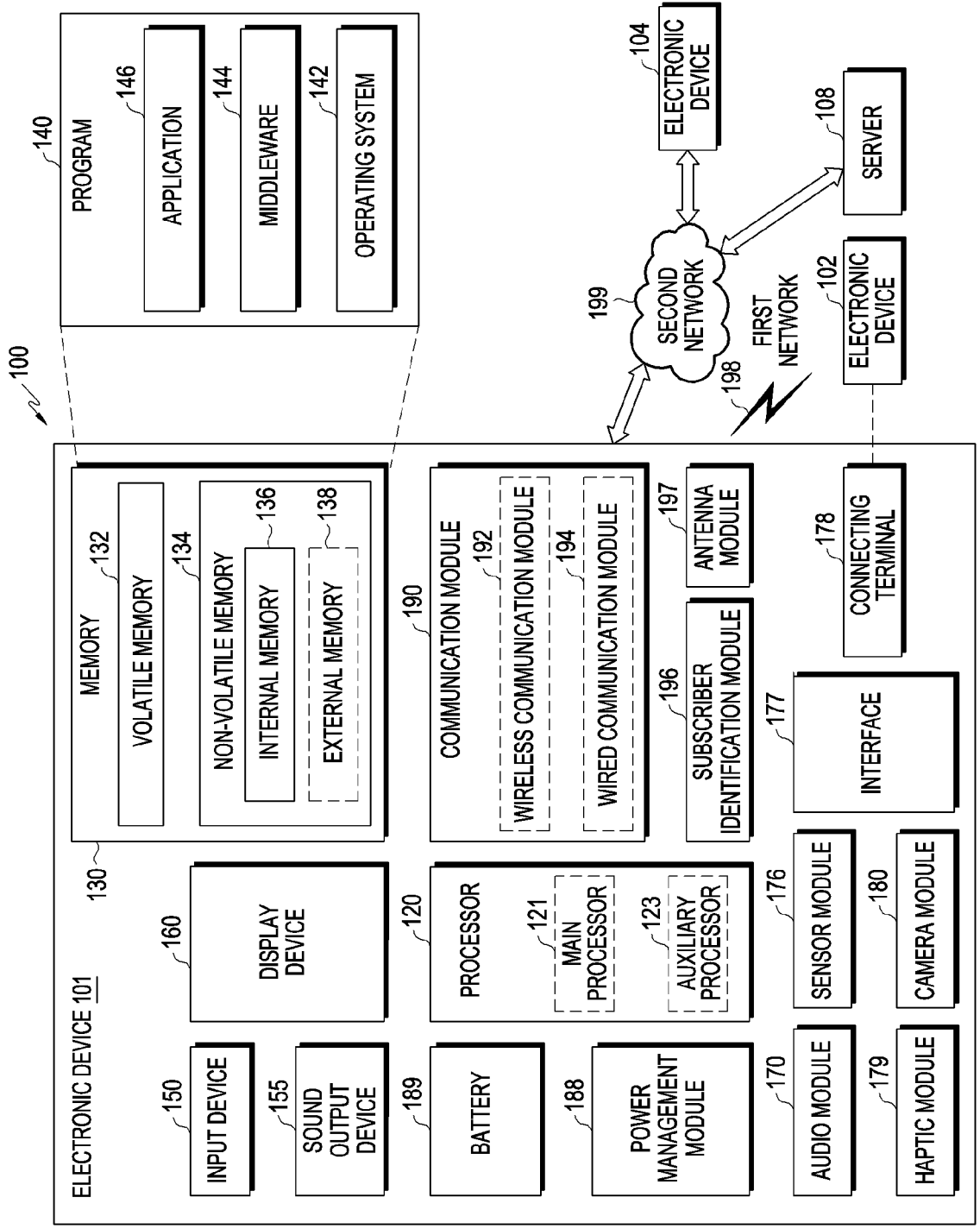
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102 and 104 or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
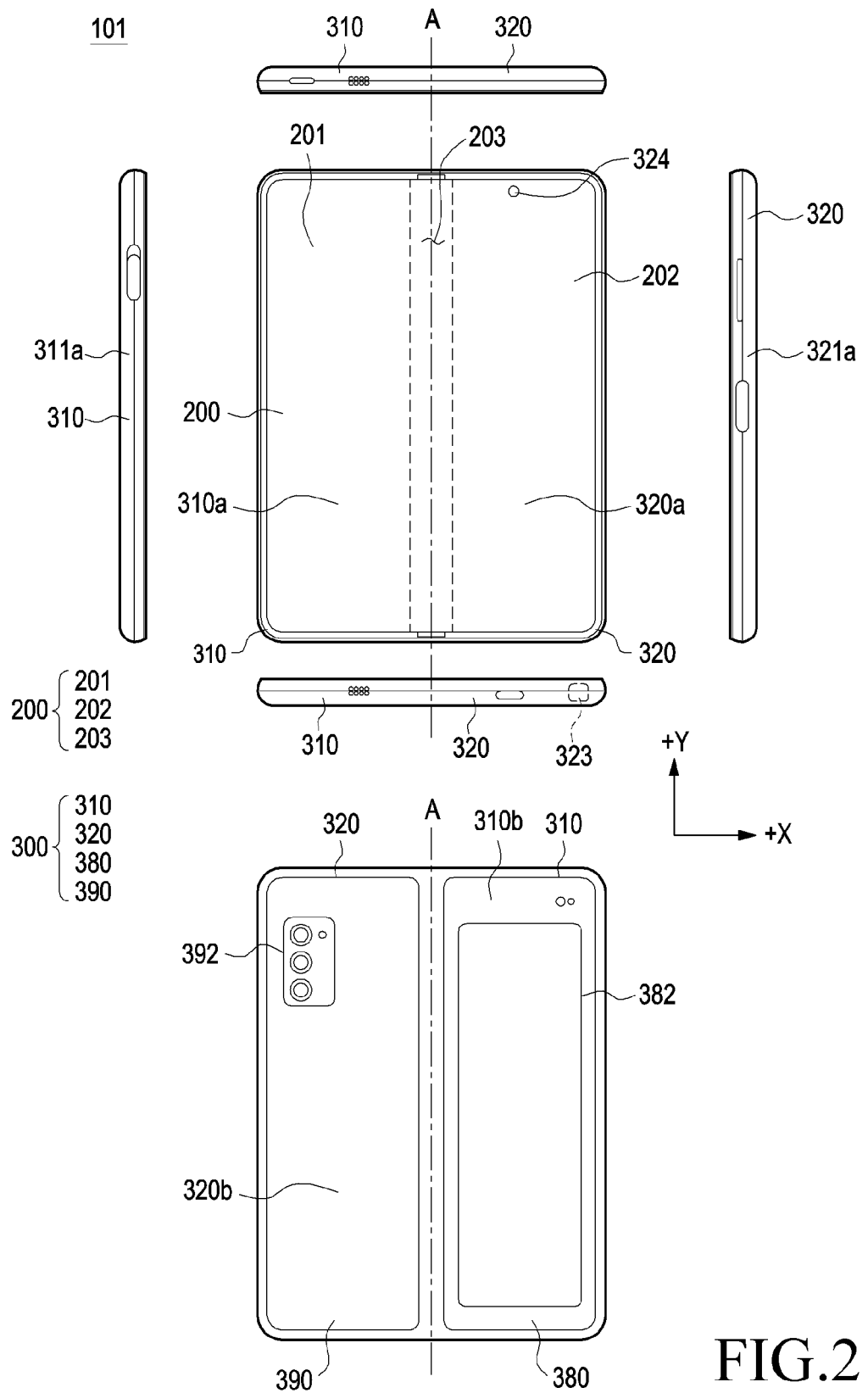
FIG. 2 is a view illustrating an unfolded state of an electronic device according to an embodiment of the disclosure.

FIG. 2 is a view illustrating an unfolded state of an electronic device according to an embodiment of the disclosure.

Figure 3:
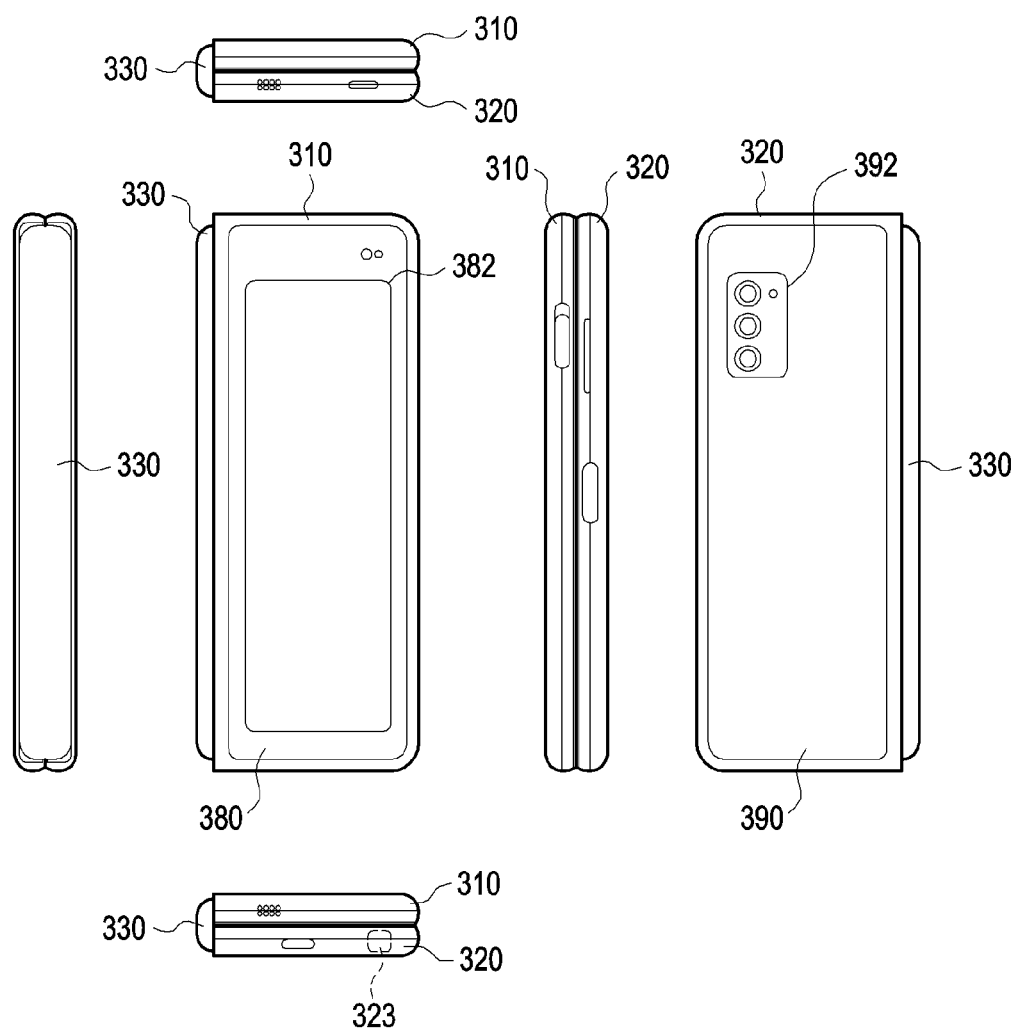
FIG. 3 is a view illustrating a folded state of an electronic device according to an embodiment of the disclosure.

FIG. 3 is a view illustrating a folded state of an electronic device according to an embodiment of the disclosure.

Figure 4:
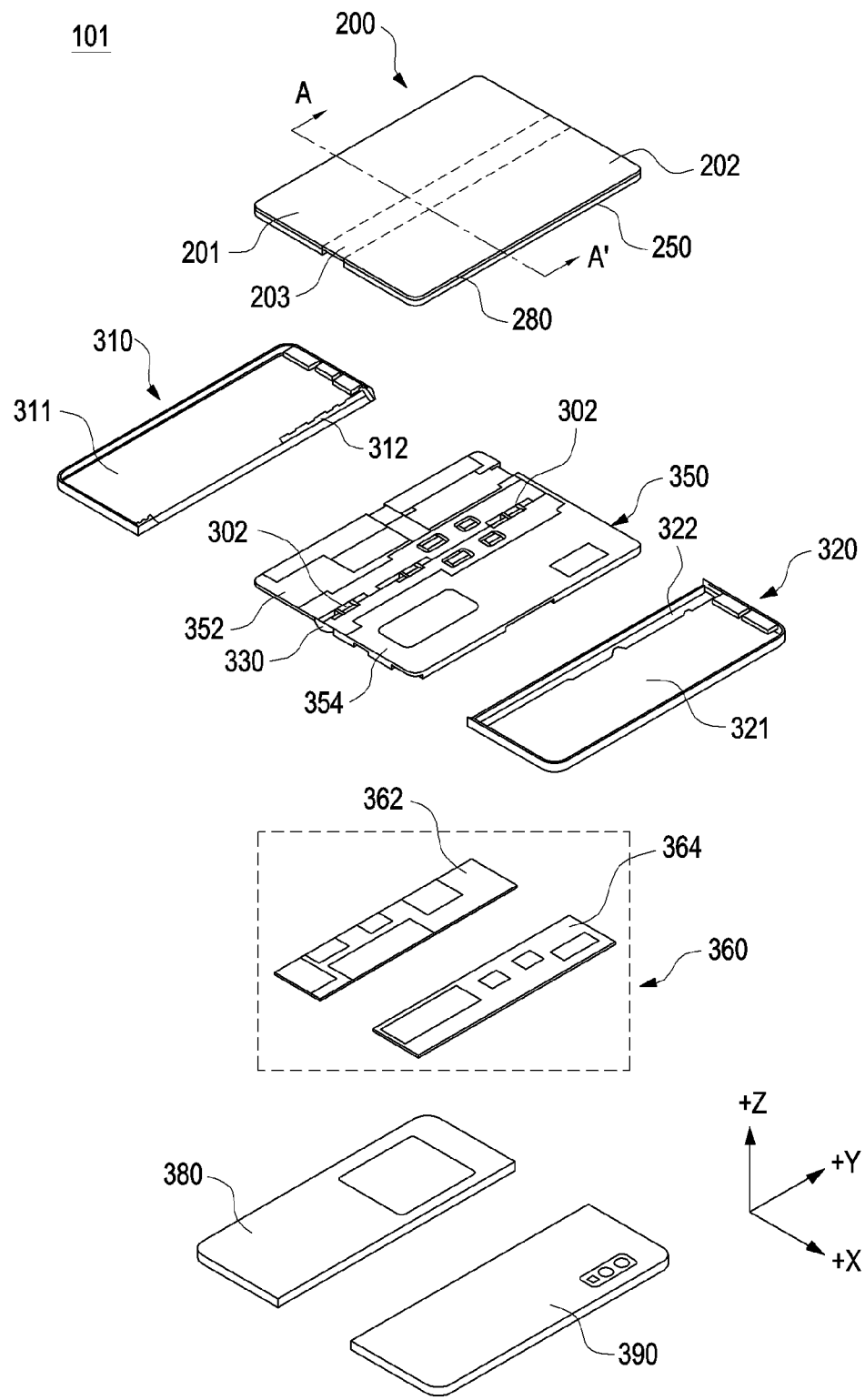
FIG. 4 is an exploded perspective view illustrating an electronic device according to an embodiment of the disclosure.

FIG. 4 is an exploded perspective view illustrating an electronic device according to an embodiment of the disclosure.

Referring to FIGS. 2 and 3, according to an embodiment, an electronic device 101 may include a foldable housing 300, a hinge cover (e.g., the hinge cover 330 of FIG. 3) covering a foldable portion of the foldable housing 300, and a flexible or foldable display 200 (hereinafter, simply "display 200") (e.g., the display device 160 of FIG. 1) disposed in a space formed by the foldable housing 300. According to an embodiment, the surface on which the display 200 is disposed is defined as a front surface (e.g., a first surface 310a and a third surface 320a) of the electronic device 101. A surface opposite to the front surface is defined as a rear surface (e.g., a second surface 310b and a fourth surface 320b) of the electronic device 101. A surface surrounding the space between the front and rear surfaces is defined as a side surface (e.g., a first side surface 311a and a second side surface 321a) of the electronic device 101.

According to various embodiments, the foldable housing 300 may include a first housing 310, a second housing 320 including a sensor area 324, a first rear cover 380, a second rear cover 390, and a hinge structure (e.g., the hinge structure 302 of FIG. 4). The foldable housing 300 of the electronic device 101 are not limited to the shape and coupling shown in FIGS. 2 and 3 but may rather be implemented in other shapes or via at least one of a combination or coupling of other components. For example, in another embodiment, the first housing 310 and the first rear cover 380 may be integrally formed with each other, and the second housing 320 and the second rear cover 390 may be integrally formed with each other. According to various embodiments, the first housing 310 may be connected to the hinge structure 302 and include a first surface 310a facing in a first direction and a second surface 310b facing in a second direction opposite to the first direction. The second housing 320 may be connected to the hinge structure 302 and may include a third surface 320a facing in a third direction and a fourth surface 320b facing in a fourth direction opposite to the third direction, and may rotate from the first housing 310 on the hinge structure 302. Thus, the electronic device 101 may turn into a folded state or unfolded state. In the folded state of the electronic device 101, the first surface 310a may face the third surface 320a and, in the unfolded state, the third direction may be identical to the first direction. According to an embodiment, in the unfolded state of the electronic device 101, the first direction and the third direction may be the +Z direction, and the second direction and the fourth direction may be the −Z direction. According to an embodiment, in the folded state of the electronic device 101, the first direction and the fourth direction may be the +Z direction, and the second direction and the third direction may be the −Z direction. Hereinafter, unless otherwise mentioned, directions are described based on the unfolded state of the electronic device 101.

According to various embodiments, the first housing 310 and the second housing 320 are disposed on both sides of the folding axis A and be overall symmetrical in shape with respect to the folding axis A. As set forth below, the first housing 310 and the second housing 320 may have different angles or distances formed therebetween depending on whether the electronic device 101 is in the unfolded, folded, or intermediate state. According to an embodiment, the second housing 320 further includes the sensor area 324 where various sensors are disposed, unlike the first housing 310 but, in the remaining area, the second housing structure 320 may be symmetrical in shape with the first housing structure 310.

According to an embodiment, the electronic device 101 may include a structure into which a digital pen (e.g., the electronic pen 1000 of FIG. 5) may be inserted. For example, a hole 323 into which the digital pen 1000 may be inserted may be formed in a side surface of the first housing 310 or a side surface of the second housing 320 of the electronic device 101. The digital pen 1000 may be inserted into the hole 323.

According to various embodiments, as shown in FIG. 2, the first housing 310 and the second housing 320 together may form a recess to receive the display 200. In an embodiment, due to the sensor area 324, the recess may have two or more different widths in the direction perpendicular to the folding axis A.

According to an embodiment, the recess may have a first width w1 between a first portion of the first housing 310, which is parallel with the folding axis A, and a third portion of the second housing 320, which is formed at an edge of the sensor area 324. The recess may have a second width w2 formed by a second portion of the first housing 310 and a fourth portion of the second housing 320, which does not correspond to the sensor area 324 and is parallel with the folding axis A. In this case, the second width w2 may be longer than the first width w1. As another example, the first portion of the first housing 310 and the third portion of the second housing 320, which are asymmetrical with each other, may form the first width w1 of the recess, and the second portion of the first housing 310 and the fourth portion of the second housing 320, which are symmetrical with each other, may form the second width w2 of the recess. In an embodiment, the third portion and fourth portion of the second housing 320 may have different distances from the folding axis A. The width of the recess is not limited thereto. According to another embodiment, the recess may have a plurality of widths due to the shape of the sensor area 324 or the asymmetric portions of the first housing 310 and the second housing 320.

According to various embodiments, the first housing 310 and the second housing 320 may at least partially be formed of a metal or non-metallic material with a rigidity selected to support the display 200. At least a portion formed of metal may provide a ground plane of the electronic device 101 and may be electrically connected with a ground line formed on a printed circuit board (e.g., the board unit 360 of FIG. 4).

According to various embodiments, the sensor area 324 may be formed adjacent to a corner of the second housing 320 and to have a predetermined area. However, the placement, shape, or size of the sensor area 324 is not limited to those illustrated. For example, in another embodiment, the sensor area 324 may be provided in a different corner of the second housing 320 or in any area between the top corner and the bottom corner. In an embodiment, components for performing various functions, embedded in the electronic device 101, may be exposed through the sensor area 324 or one or more openings in the sensor area 324 to the front surface of the electronic device 101. In various embodiments, the components may include various kinds of sensors. The sensor may include at least one of, for example, a front-facing camera, a receiver, or a proximity sensor.

According to various embodiments, the first rear cover 380 may be disposed on one side of the folding axis A on the rear surface of the electronic device 101 and have, for example, a substantially rectangular periphery which may be surrounded by the first housing 310. Similarly, the second rear cover 390 may be disposed on the opposite side of the folding axis A on the rear surface of the electronic device 101 and its periphery may be surrounded by the second housing 320.

According to various embodiments, the first rear cover 380 and the second rear cover 390 may be substantially symmetrical in shape with respect to the folding axis (axis A). However, the first rear cover 380 and the second rear cover 390 are not necessarily symmetrical in shape. In another embodiment, the electronic device 101 may include the first rear cover 380 and the second rear cover 390 in various shapes. In another embodiment, the first rear cover 380 may be integrally formed with the first housing 310, and the second rear cover 390 may be integrally formed with the second housing 320.

According to various embodiments, the first rear cover 380, the second rear cover 390, the first housing 310, and the second housing 320 may form a space where various components (e.g., a printed circuit board or battery) of the electronic device 101 may be disposed. According to an embodiment, one or more components may be arranged or visually exposed on or through the rear surface of the electronic device 101. For example, at least a portion of a sub display (e.g., the sub display 270 of FIG. 8) may be visually exposed through a first rear surface area 382 of the first rear cover 380. In another embodiment, one or more components or sensors may be visually exposed through a second rear surface area 392 of the second rear cover 390. According to various embodiments, the sensor may include at least one of a proximity sensor or a rear-facing camera.

According to various embodiments, a front camera exposed to the front surface of the electronic device 101 through one or more openings prepared in the sensor area 324 or a rear camera exposed through a second rear surface area 392 of the second rear cover 390 may include at least one of one or more lenses, an image sensor, or an image signal processor. The flash 313 may include, for example, a light emitting diode (LED) or a xenon lamp. According to an embodiment, two or more lenses (an infrared (IR) camera, a wide-angle lens, and a telephoto lens) and image sensors may be disposed on one surface of the electronic device 101.

Referring to FIG. 3, the hinge cover 330 may be disposed between the first housing 310 and the second housing 320 to hide the internal components (e.g., the hinge structure 302 of FIG. 4). According to an embodiment, the hinge cover 330 may be hidden by a portion of the first housing 310 and second housing 320 or be exposed to the outside depending on the state (e.g., the unfolded state (e.g., flat state) or folded state) of the electronic device 101.

According to an embodiment, as shown in FIG. 2, in the unfolded state of the electronic device 101, the hinge cover 330 may be hidden, and thus not exposed, by the first housing 310 and the second housing 320. As another example, as shown in FIG. 3, in the folded state (e.g., a fully folded state) of the electronic device 101, the hinge cover 330 may be exposed to the outside between the first housing 310 and the second housing 320. As another example, in an intermediate state in which the first housing 310 and the second housing 320 are folded with a certain angle, the hinge cover 330 may be partially exposed to the outside between the first housing 310 and the second housing 320. In this case, however, the exposed area may be smaller than in the fully folded state. According to an embodiment, the hinge cover 330 may include a curved surface.

According to various embodiments, the display 200 may be disposed in a space formed by the foldable housing 300. For example, the display 200 may be seated on a recess formed by the foldable housing 300 and may occupy most of the front surface of the electronic device 101. Thus, the front surface of the electronic device 101 may include the display 200 and a partial area of the first housing 310 and a partial area of the second housing 320, which are adjacent to the display 200. The rear surface of the electronic device 101 may include a first rear cover 380, a partial area of the first housing 310 adjacent to the first rear cover 380, a second rear cover 390, and a partial area of the second housing 320 adjacent to the second rear cover 390.

According to various embodiments, the display 200 may mean a display at least a portion of which may be transformed into a flat or curved surface. According to an embodiment, the display 200 may include a folding area 203, a first area 201 disposed on one side of the folding area 203 (e.g., the left side of the folding area 203 of FIG. 2), and a second area 202 disposed on the opposite side of the folding area 203 (e.g., the right side of the folding area 203 of FIG. 2).

However, the segmentation of the display 200 as shown in FIG. 2 is merely an example, and the display 200 may be divided into a plurality of (e.g., four or more, or two) areas depending on the structure or function of the display 200. For example, in the embodiment illustrated in FIG. 2, the display 200 may be divided into the areas by the folding area 203 or folding axis (axis A) extending in parallel with the y axis but, in another embodiment, the display 200 may be divided into the areas with respect to another folding area (e.g., a folding area parallel with the x axis) or another folding axis (e.g., a folding axis parallel with the x axis). According to an embodiment, the display 200 may be coupled with or disposed adjacent to at least one of a touch detection circuit, a pressure sensor capable of measuring the strength (pressure) of touches, or a digitizer (e.g., the pen driving circuit 500 of FIG. 5) for detecting a magnetic field-type stylus pen.

According to various embodiments, the first area 201 and the second area 202 may be overall symmetrical in shape with respect to the folding area 203. However, unlike the first area 201, the second area 202 may include a notch depending on the presence of the sensor area 324, but the rest may be symmetrical in shape with the first area 201. In other words, the first area 201 and the second area 202 may include symmetrical portions and asymmetrical portions.

Described below are the operation of the first housing 310 and the second housing 320 and each area of the display 200 depending on the state (e.g., the unfolded state (or flat state) and folded state) of the electronic device 101.

According to various embodiments, when the electronic device 101 is in the unfolded state (flat state) (e.g., FIG. 2), the first housing 310 and the second housing 320 may be disposed to face in the same direction while being angled at 180 degrees therebetween. The surface of the first area 201 and the surface of the second area 202 of the display 200 may be angled at 180 degrees therebetween while facing in the same direction (e.g., forward of the front surface of the electronic device). The folding area 203 may be coplanar with the first area 201 and the second area 202.

According to various embodiments, when the electronic device 101 is in the folded state (e.g., FIG. 3), the first housing 310 and the second housing 320 may be disposed to face each other. The surface of the first area 201 and the surface of the second area 202 of the display 200 may be angled at a small angle (e.g., ranging from 0 degrees to 10 degrees) therebetween while facing each other. At least a portion of the folding area 203 may have a curved surface with a predetermined curvature.

According to various embodiments, when the electronic device 101 is in the intermediate state (folded state) (e.g., FIG. 3), the first housing 310 and the second housing 320 may be disposed at a certain angle therebetween. The surface of the first area 201 of the display 200 and the surface of the second area 202 may form an angle which is larger than the angle in the folded state and smaller than the angle in the unfolded state. The folding area 203 may at least partially have a curved surface with a predetermined curvature and, in this case, the curvature may be smaller than that when it is in the folded state.

Referring to FIG. 4, the electronic device 101 may include a foldable housing 300, a display 200, and a board unit 360. The foldable housing 300 may include a first housing 310, a second housing 320, a bracket assembly 350, a first rear cover 380, a second rear cover 390, and a hinge structure 302.

According to various embodiments, the display 200 may include a display panel 280 and at least one support plate 250 on which the display panel 280 is seated. The support plate 250 may be disposed between the display panel 280 and the bracket assembly 350.

According to various embodiments, the bracket assembly 350 may include a first mid plate 352 and a second mid plate 354. The hinge structure 302 may be disposed between the first mid plate 352 and the second mid plate 354. When viewed from the outside, the hinge structure 302 may be covered by a hinge cover (e.g., the hinge cover 330 of FIG. 3). According to an embodiment, a printed circuit board (e.g., a flexible printed circuit (FPC)) crossing the first mid plate 352 and the second mid plate 354 may be disposed on the bracket assembly 350.

According to various embodiments, the board unit 360 may include a first circuit board 362 disposed on the first mid plate 352 and a second circuit board 364 disposed on the second mid plate 354. The first circuit board 362 and the second circuit board 364 may be disposed in a space formed by the bracket assembly 350, the first housing 310, the second housing 320, the first rear cover 380, and the second rear cover 390. Components for implementing various functions of the electronic device 101 may be mounted on the first circuit board 362 and the second circuit board 364.

According to various embodiments, the first housing 310 and the second housing 320 may be assembled together to be coupled to two opposite sides of the bracket assembly 350, with the display 200 coupled to the bracket assembly 350. According to an embodiment, the first housing 310 may include a first side member 311 at least partially surrounding the side surface of the first mid plate 352, and the second housing structure 310 may include a second side member 321 at least partially surrounding the side surface of the second mid plate 354. The first housing 310 may include a first rotation supporting surface 312, and the second housing 320 may include a second rotation supporting surface 322 corresponding to the first rotation supporting surface 312. The first rotation supporting surface 312 and the second rotation supporting surface 322 may include a curved surface corresponding to a curved surface included in the hinge cover 330. According to an embodiment, the first side member 311 may include a first side surface 311a surrounding at least a portion between the first surface 310a and the second surface 310b and perpendicular to the first direction or the second direction. According to an embodiment, the second side member 321 may include a second side surface surrounding at least a portion between the third surface 320a and the fourth surface 320b and perpendicular to the third direction or fourth direction.

According to an embodiment, the first rotation supporting surface 312 and the second rotation supporting surface 322, in the unfolded state of the electronic device 101 (e.g., the electronic device of FIG. 2), may cover the hinge cover 330, allowing the hinge cover 330 to be not or minimally exposed through the rear surface of the electronic device 101. As another example, the first rotation supporting surface 312 and the second rotation supporting surface 322, in the folded state of the electronic device 101 (e.g., the electronic device of FIG. 3), may rotate along the curved surface included in the hinge cover 330, allowing the hinge cover 330 to be maximally exposed through the rear surface of the electronic device 101.

Figure 5:
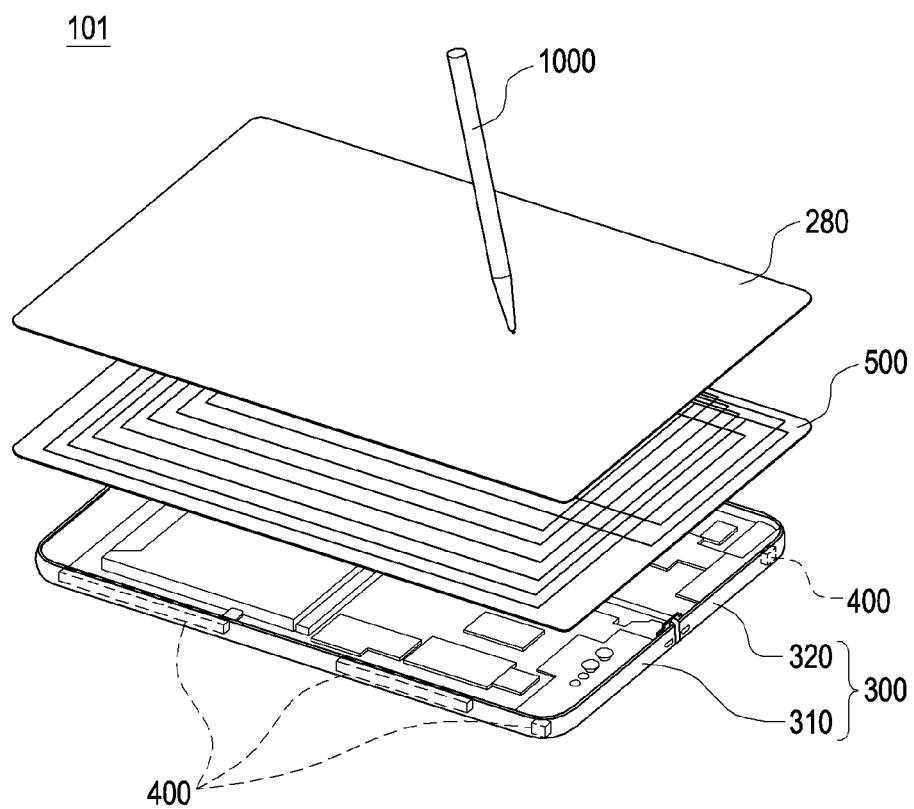
FIG. 5 is an exploded perspective view illustrating an electronic device including a pen driving circuit according to an embodiment of the disclosure.

FIG. 5 is an exploded perspective view illustrating an electronic device including a pen driving circuit according to an embodiment of the disclosure.

Figure 6:
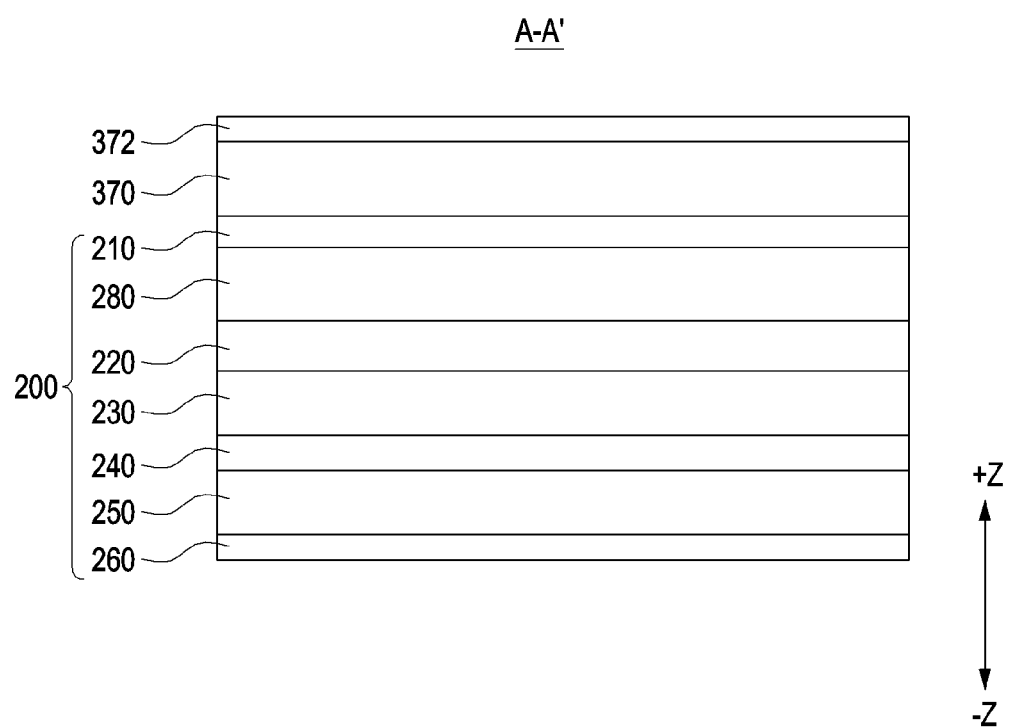
FIG. 6 is a cross-sectional view taken along line A-A' of FIG. 4 according to an embodiment of the disclosure.

FIG. 6 is a cross-sectional view taken along line A-A' of FIG. 4 according to an embodiment of the disclosure.

Referring to FIGS. 5 and 6, the electronic device 101 may include a display 200, a foldable housing 300, a magnet array 400, and a pen driving circuit 500.

According to various embodiments, the foldable housing 300 may include a window member 370. At least a portion of the window member 370 may be formed of a substantially transparent material. For example, the window member may be formed of ultra-thin glass (UTG) or a polyimide film. The display panel 280 may be exposed to the outside of the electronic device 101 through the window member 370. According to an embodiment, the window member 370 may form at least a portion of the outer surface of the window member 370. According to an embodiment, the electronic device 101 may include a coating layer 372 disposed on the window member 370. The coating layer 372 may protect the window member 370 and the display 200 from external impact of the electronic device 101.

According to various embodiments, the display 200 may include components for outputting an image to the outside of the electronic device 101. For example, the display 200 may include at least one of a display panel 280, a polarization film 210 disposed between the display panel 280 and the window member 370, a cushion support layer disposed under the display panel 280, a cushion layer 230 disposed under the cushion support layer 220, a shielding sheet 240 disposed under the cushion layer 230, a support plate 250 disposed under the shielding sheet 240, and a heat dissipation sheet 260 disposed under the plate 250.

According to various embodiments, the electronic device 101 may include a pen driving circuit 500, the pen driving circuit 500 configured to transmit an electromagnetic field signal. For example, the resonance circuit of the electronic pen 1000 connected to the electronic device 101 through a wireless communication module (e.g., the wireless communication module 192 of FIG. 1) may be resonated based on the electromagnetic field signal generated from the pen driving circuit 500 of the electronic device 101 and radiate an electromagnetic resonance (EMR) input signal by resonance. The electronic device 101 may identify the position of the electronic pen 1000 over the electronic device 101 using the EMR input signal. For example, the electronic device 101 may identify the position of the electronic pen 1000 based on the magnitude of the electromotive force (e.g., output current) generated by the EMR input signal at each of a plurality of channels (e.g., a plurality of loop coils) in the pen driving circuit 500. Although the electronic device 101 and the electronic pen 1000 are described as operated based on the EMR scheme, this is merely an example. For example, the electronic device 101 may generate an electrical field-based signal based on an electrically coupled resonance (ECR) scheme.

According to various embodiments, the resonance circuit of the electronic pen 1000 may be resonated by the electric field. The electronic device 101 may identify the electric potential at the plurality of channels (e.g., electrodes) by the resonance of the electronic pen 1000 and may identify the position of the electronic pen 1000 based on the electric potential. The electronic pen 1000 may be implemented in an active electrostatic (AES) scheme, and it will be easily appreciated by one of ordinary skill in the art that it is not limited to a specific kind of implementation. According to an embodiment, the electronic device 101 may detect the electronic pen 1000 based on a variation in capacitance (self capacitance or mutual capacitance) associated with at least one electrode of the touch panel. In this case, the electronic pen 1000 may not include the resonance circuit.

According to various embodiments, the pen driving circuit 500 may be disposed under the display panel 280. According to an embodiment, the pen driving circuit 500 may be disposed between the cushion layer 230 and the shielding sheet 240. According to another embodiment, the pen driving circuit 500, together with the shielding sheet 240, may be disposed between the support plate 250. According to another embodiment, the pen driving circuit 500, together with the shielding sheet 240, may be disposed between the support plate 250 and the heat dissipation sheet 260. According to another embodiment, the pen driving circuit 500 may be disposed under the heat dissipation sheet 260. According to various embodiments, the magnet array 400 may be disposed on an edge of the electronic device 101. For example, a first magnet array (e.g., the first magnet array 410 of FIG. 7) may be disposed on the edge of the first housing 310, and a second magnet array (e.g., the second magnet array 420 of FIG. 7) may be disposed on the edge of the second housing 320. According to an embodiment, the shielding sheet 240 may be disposed below the pen driving circuit 500 (e.g., in the −Z direction).

According to various embodiments, the magnet array 400 may reduce the gap between the first housing 310 and the second housing 320 which is formed by the repulsive force generated from the first housing 310 and the second housing 320 when the electronic device 101 is folded. For example, in the folded state of the electronic device 101, the magnet array 400 disposed in the first housing 310 and the magnet array 400 disposed in the second housing 320 may form magnetic fields that are directed substantially in the same direction, so that the first housing 310 and the second housing 320 may obtain attractive force.

According to various embodiments, the magnet array 400 may be formed of various materials. For example, the magnet array 400 may include neodymium (Nd), iron (Fe), and boron (B).

Figure 7:
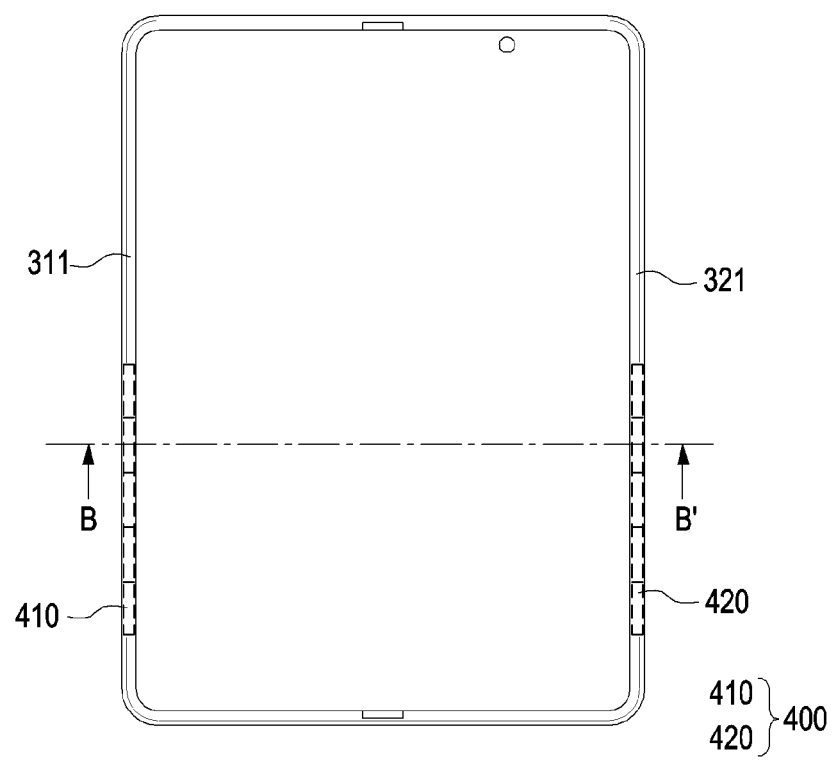
FIG. 7 is a front view illustrating an electronic device according to an embodiment of the disclosure.

FIG. 7 is a front view illustrating an electronic device according to an embodiment of the disclosure.

Figure 8:
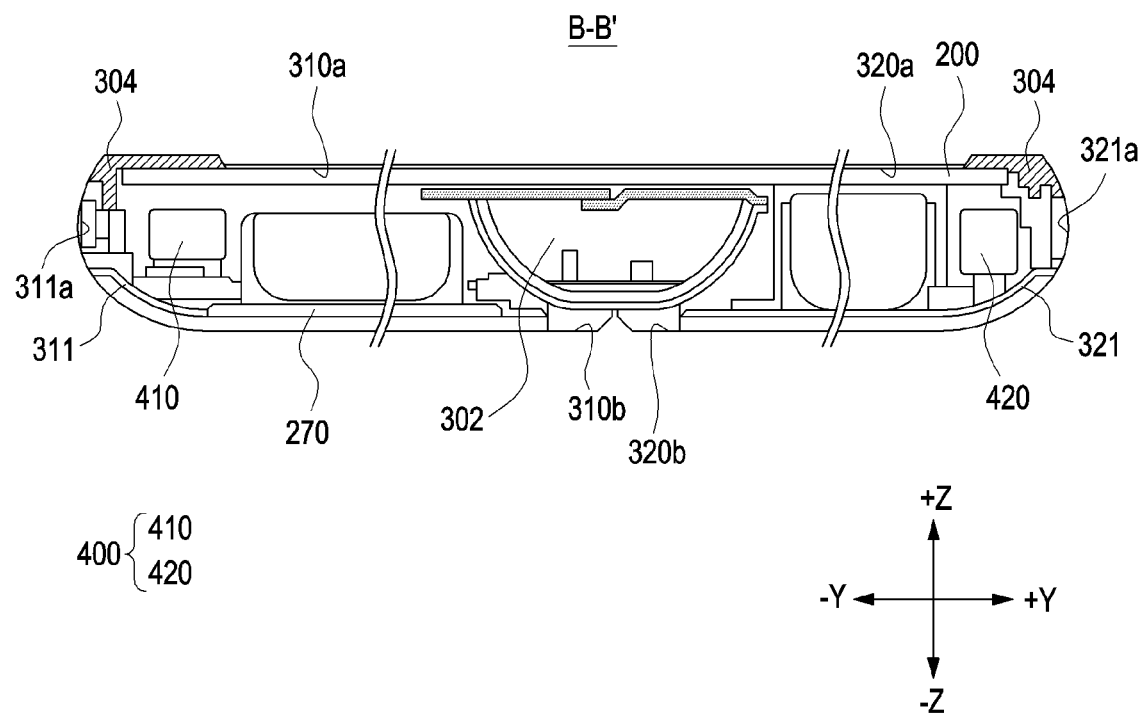
FIG. 8 is a cross-sectional view taken along line B-B' of FIG. 7 according to an embodiment of the disclosure.

FIG. 8 is a cross-sectional view taken along line B-B' of FIG. 7 according to an embodiment of the disclosure.

Referring to FIGS. 7 and 8, a magnet array 400 of an electronic device 101 may include a first magnet array 410 disposed in a first housing 310 and a second magnet array 420 disposed in a second housing 320. The configuration of the magnet array 400 of FIGS. 7 and 8 may be identical in whole or part to the configuration of the magnet array 400 of FIG. 5.

According to various embodiments, the magnet array 400 may be disposed on an edge or border of the electronic device 101. For example, the first magnet array 410 may be disposed adjacent to a first side member 311, and the second magnet array 420 may be disposed adjacent to a second side member 321.

According to various embodiments, the electronic device 101 may include a deco member 304 forming at least a portion of the edge of the electronic device 101. According to an embodiment, when the electronic device 101 is viewed from there above (e.g., +Z direction), the deco member 304 may surround at least a portion of the first surface 310a or at least a portion of the second surface 320a. According to an embodiment, the deco member 304 may form at least a portion of the first side surface 311a or the second side surface 321a.

According to various embodiments, the first magnet array 410 may be disposed in the first housing 310. According to an embodiment, the first magnet array 410 may be disposed between the first surface 310a and second surface 310b of the first housing 310 in the height direction (e.g., Z-axis direction) and be disposed between the first side surface 311a and hinge structure 302 in the horizontal direction (e.g., X-axis direction). According to an embodiment, the first magnet array 410 may be disposed adjacent to the deco member 304. For example, when the electronic device 101 is viewed from there above (+Z direction), at least a portion of the first magnet array 410 may overlap at least a portion of the deco member 304.

According to various embodiments, the second magnet array 420 may be disposed in the second housing 320. According to an embodiment, the second magnet array 420 may be disposed between the third surface 320a and fourth surface 320b of the second housing 320 in the height direction (e.g., Z-axis direction) and be disposed between the second side surface 321a and hinge structure 302 in the horizontal direction (e.g., X-axis direction). According to an embodiment, the second magnet array 420 may be disposed adjacent to the deco member 304. For example, when the electronic device 101 is viewed from there above (e.g., +Z direction), at least a portion of the second magnet array 420 may overlap at least a portion of the deco member 304.

According to various embodiments, at least a portion of the magnet array 400 may be disposed under the display 200. For example, when the magnet array 400 is viewed in the second direction (−Z direction), at least a portion of the magnet array 400 may overlap the display 200.

According to various embodiments, the electronic device 101 may include a sub display 270. The sub display 270 may be visually exposed through a first rear surface area (e.g., the first rear surface area 382 of FIG. 2). At least a portion of the first magnet array 410 may be disposed between the display 200 and the sub display 270.

Figure 9A:
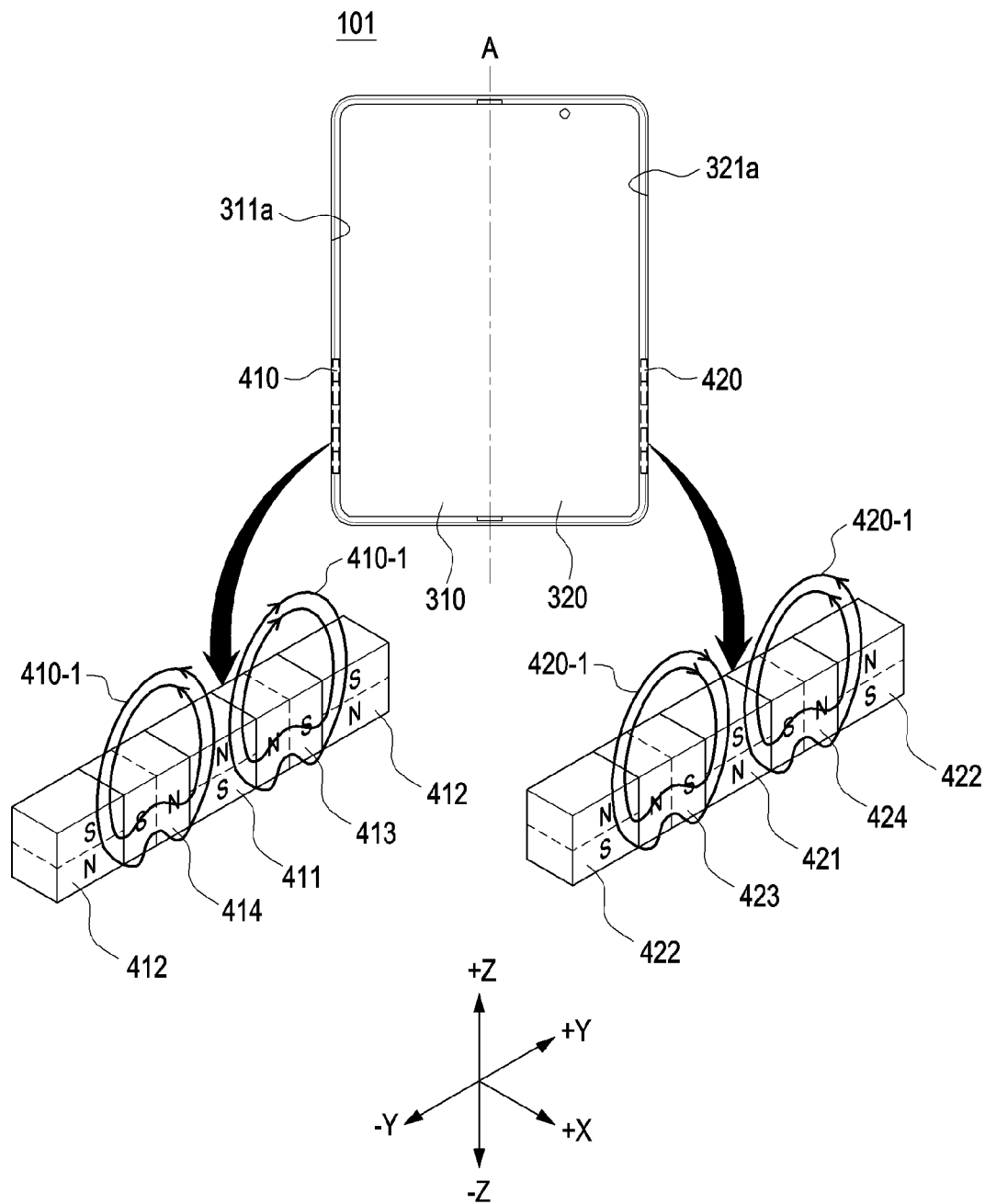
FIG. 9A is a front view illustrating an electronic device having a magnet array in an unfolded state according to an embodiment of the disclosure.

FIG. 9A is a front view illustrating an electronic device having a magnet array in an unfolded state according to an embodiment of the disclosure.

Figure 9B:
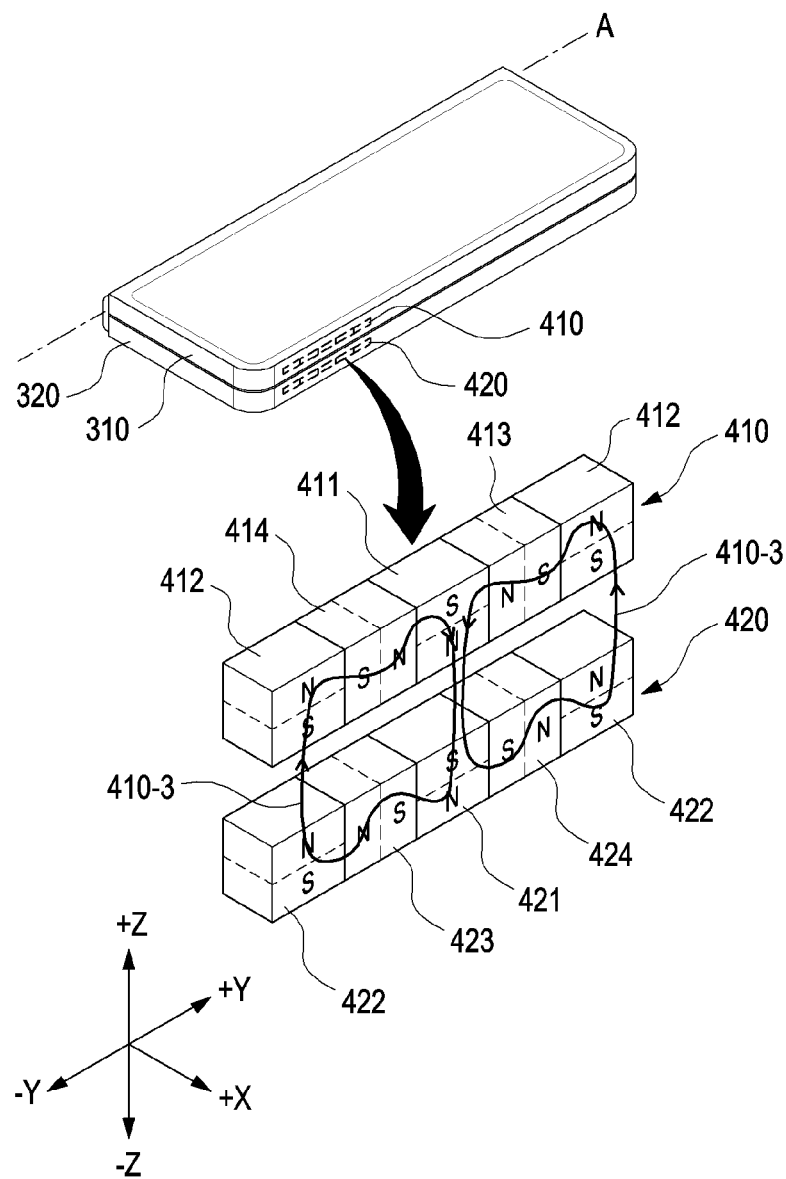
FIG. 9B is a perspective view illustrating an electronic device having a magnet array in a folded state according to an embodiment of the disclosure.

FIG. 9B is a perspective view illustrating an electronic device having a magnet array in a folded state according to an embodiment of the disclosure.

Figure 10:
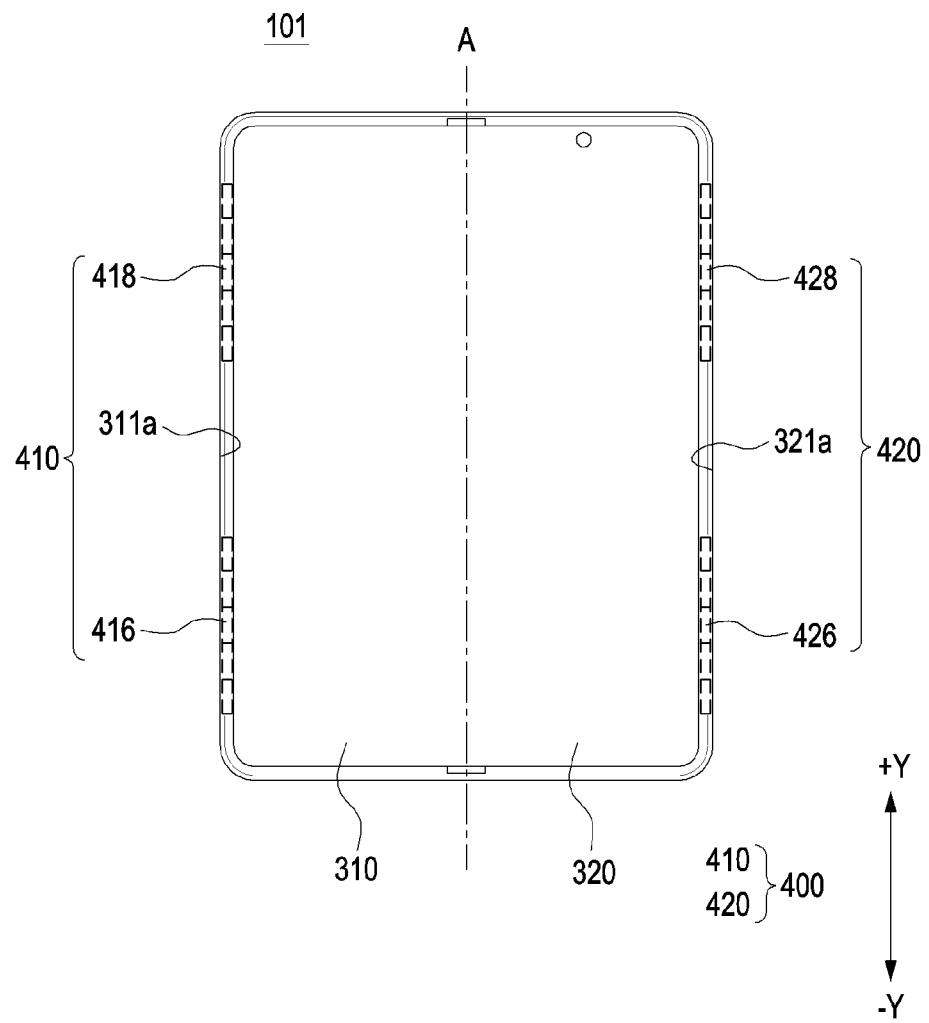
FIG. 10 is a perspective view illustrating an electronic device including a plurality of magnet arrays according to an embodiment of the disclosure.

FIG. 10 is a perspective view illustrating an electronic device including a plurality of magnet arrays according to an embodiment of the disclosure.

Figure 11:
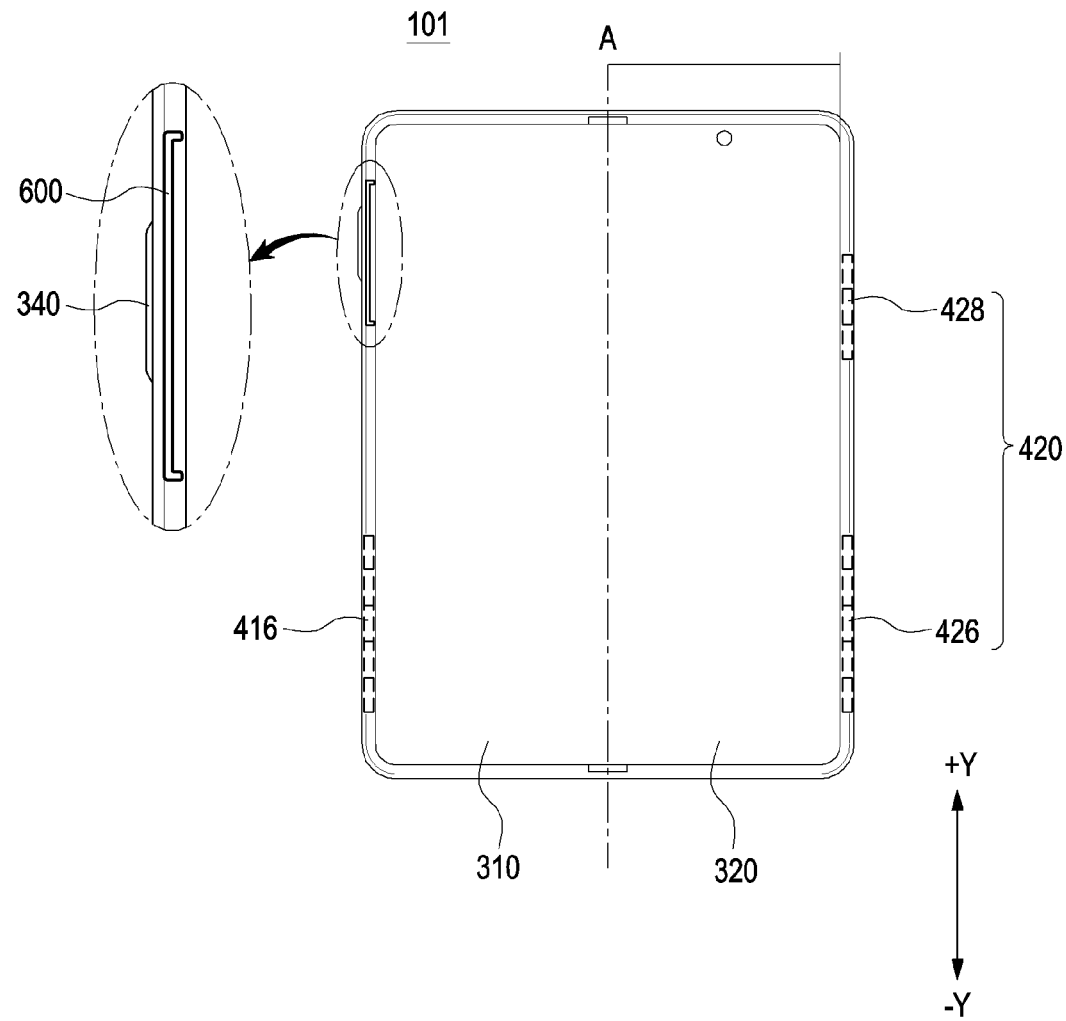
FIG. 11 is a perspective view illustrating an electronic device including a magnetic substance according to an embodiment of the disclosure.

FIG. 11 is a perspective view illustrating an electronic device including a magnetic body according to an embodiment of the disclosure.

FIGS. 12A, 12B, 12C, and 12D are views schematically illustrating a magnet array according to various embodiments of the disclosure.

Referring to FIGS. 9A, 9B, and 10, the magnet array 400 may include a plurality of magnets. The configuration of the magnet array 400 of FIGS. 9A, 9B, and 10 may be identical in whole or part to the configuration of the magnet array 400 of FIGS. 7 and 8.

According to various embodiments, the magnet array 400 may be disposed substantially parallel to the folding axis (A axis). For example, the magnet array 400 may include a plurality of magnets arranged along the axial direction (Y-axis direction).

According to various embodiments, in a state in which the electronic device 101 is folded about the folding axis (axis A) (e.g., FIG. 9B), the first magnet array 410 and the second magnet array 420 correspond to each other. For example, the distance between the first magnet array 410 and the folding axis (A axis) may be substantially the same as the distance between the second magnet array 420 and the folding axis (A axis). According to an embodiment, when the electronic device 101 in the folded state is viewed in the first direction, at least a portion of the first magnet array 410 may overlap at least a portion of the second magnet array 420. According to an embodiment, the first magnet array 410 and the second magnet array 420 may be disposed substantially parallel to each other in the axial direction (Y-axis direction). According to an embodiment, in the folded state (e.g., FIG. 9B) of the electronic device 101, the first magnet array 410 may be magnetically connected with the second magnet array 420 using a magnetic field. For example, the first magnet array 410 and the second magnet array 420 may receive an attractive force therebetween using a third magnetic field 410-3 which is formed as a combination of a first magnetic field 410-1 of the first magnet array 410 and a second magnetic field 410-2 of the second magnet array 420. According to an embodiment, the user's unintentional unfolding due to the repulsing force of the display (e.g., the display 200 of FIG. 4) may be reduced or prevented by the third magnetic field 410-3 of the first magnet array 410 and the second magnet array 420.

According to various embodiments, the magnet array 400 may be disposed in a first designated array. The first designated array may be defined as a magnet array in which the magnitude of the magnetic field in the height direction (e.g., Z-axis direction) of the magnet array 400 substantially parallel to the folding axis (A axis) is larger than the magnitude of the magnetic field in the horizontal direction (e.g., X-axis direction). According to an embodiment, the first magnet array 410 may generate the first magnetic field 410-1. With respect to the central axis (e.g., Y axis) of the first magnet array 410 of the electronic device 101 in the unfolded state, the magnitude of the first magnetic field 410-1 formed in the first direction (+Z direction) may be larger than the magnitude of the first magnetic field 410-1 formed in the second direction (−Z direction), fifth direction (+Y direction) or sixth direction (−Y direction). According to another embodiment, the second magnet array 420 may generate the second magnetic field 420-1. With respect to the central axis (e.g., Y axis) of the second magnet array 420 of the electronic device 101 in the unfolded state, the magnitude of the second magnetic field 420-1 formed in the third direction (+Z direction) may be larger than the magnitude of the second magnetic field 420-1 formed in the fourth direction (−Z direction), fifth direction (+Y direction) or sixth direction (−Y direction). According to various embodiments, the first designated array may be a three-dimensional multipolar array. According to an embodiment, the three-dimensional multipolar array may include a Halbach array. On one surface (e.g., the ninth surface 410c of FIGS. 17A to 17C) of the magnet array 400 disposed in the three-dimensional multipolar array, the magnetic fields may overlap and increase and, on the other surface (e.g., the ninth surface 410d of FIGS. 17A to 17C), the magnetic fields may be offset and reduced.

According to various embodiments, the magnet array 400 may include a plurality of magnets forming various magnetic field directions.

According to an embodiment, the first magnet array 410 may include a 1-1th magnet 411, a 1-2th magnet 412, a 1-3th magnet 413, and a 1-4th magnet 414 that respectively form magnetic fields in different directions. For example, the 1-1th magnet 411 may have an N pole positioned in the first direction (+Z direction) of the 1-1th magnet 411 to form a magnetic field facing the first surface (e.g., the first surface 310a of FIG. 2), and the 1-2th magnet 412 may have an N pole positioned in the second direction (−Z direction) of the 1-2th magnet 412 to form a magnetic field facing the second surface (e.g., the second surface 310b of FIG. 2). The N pole of the 1-3th magnet 413 may be positioned in the sixth direction (−Y direction) of the 1-3th magnet, and the 1-3th magnet 413 may form a magnetic field facing an end in the sixth direction (−Y direction) of the first magnet array 410. The N pole of the 1-4th magnet 414 may be positioned in the fifth direction (+Y direction) of the 1-4th magnet, and the 1-4th magnet 414 may form a magnetic field facing an end in the fifth direction (+Y direction) of the first magnet array 410. According to an embodiment, the magnets 411, 412, 413, and 414 of the first magnet array 410 may be coupled to each other while directly facing the other magnets 411, 412, 413, and 414. For example, no separate non-magnetic material (e.g., a metal or resin block) for coupling may be positioned between the magnets 411, 412, 413, and 414 and the other magnets 411, 412, 413, and 414. As another example, no gap (or space) may be formed between the magnets 411, 412, 413, and 414 and the other magnets 411, 412, 413, and 414. According to an embodiment, the second magnet array 420 may include a 2-1th magnet 421, a 2-2th magnet 422, a 2-3th magnet 423, and a 2-4th magnet 424 that form magnetic fields in different directions. For example, the N pole of the 2-1th magnet 421 may be positioned in the fourth direction (−Z direction) of the 2-1th magnet 421, and the 2-1th magnet 421 may form a magnetic field in a direction towards the fourth surface 320b. For example, the N pole of the 2-2th magnet 422 may be positioned in the third direction (+Z direction) of the 2-2th magnet 422, and the 2-2th magnet 422 may form a magnetic field in a direction towards the third surface 320a. The N pole of the 2-3th magnet 423 may be positioned in the sixth direction (−Y direction) of the 2-3th magnet, and the 2-3th magnet 423 may form a magnetic field facing an end in the sixth direction (−Y direction) of the second magnet array 420. The N pole of the 2-4th magnet 424 may be positioned in the fifth direction (+Y direction) of the 2-4th magnet, and the 2-4th magnet 424 may form a magnetic field facing an end in the fifth direction (+Y direction) of the second magnet array 420. According to an embodiment, the magnets 421, 422, 423, and 4@4 of the second magnet array 420 may be coupled to each other while directly facing the other magnets 421, 422, 423, and 424. For example, no separate non-magnetic material (e.g., a metal or resin block) for coupling may be positioned between the magnets 421, 422, 423, and 424 and the other magnets 421, 422, 423, and 424. As another example, no gap (or space) may be formed between the magnets 421, 422, 423, and 424 and the other magnets 421, 422, 423, and 424.

According to various embodiments, the electronic device 101 may include a plurality of magnet arrays 400. According to an embodiment, the first magnet array 410 may include a 1-1th magnet array 416 and a 1-2th magnet array 418 arranged along the first side surface 311*a*. The 1-1th magnet array 416 and the 1-2th magnet array 418 may be disposed in substantially the same axial direction (Y-axis direction). According to an embodiment, the second magnet array 420 may include a 2-1th magnet array 426 and a 2-2th magnet array 428 arranged along the second side surface 321*a*. The 2-1th magnet array 426 and the 2-2th magnet array 428 may be disposed in substantially the same axial direction (Y-axis direction). In the disclosure, for convenience of description, it has been described that one or two magnet arrays 400 are arranged on the same axis, but this is merely an example and three or more magnet arrays 400 may be disposed on the same axis.

According to various embodiments, in the folded state of the electronic device 101, the first magnet array 410 and the second magnet array 420 may correspond to each other. For example, in the folded state of the electronic device 101, at least a portion of the first magnet array 410 may overlap at least a portion of the second magnet array 420. According to an embodiment, the 1-1th magnet 411 may overlap the 2-1th magnet 421, and the 1-2th magnet 412 may overlap the 2-2th magnet 422. According to an embodiment, the 1-3th magnet 413 may overlap the 2-4th magnet 424, and the 1-4th magnet 414 may overlap the 2-3th magnet 423.

Referring to FIG. 11, the electronic device 101 may include a magnetic substance 600.

According to various embodiments, the magnetic substance 600 may refer to a component formed of a magnetic material (e.g., stainless use steel (SUS 430)) among the components of the electronic device 101.

According to various embodiments, the electronic device 101 may include a key input device 340, the key input device 340 configured to obtain the user's input from the outside of the electronic device 101. The key input device 340 may be at least one of, for example, a volume key, a Bixby key, and a power key. According to an embodiment, the magnetic substance 600 may be a side supporting member 340 for supporting the key input device from external pressure.

According to various embodiments, the magnetic substance 600 may be disposed to correspond to at least a portion of the magnet array 400. For example, in the folded state of the electronic device 101, the magnetic substance 600 may face the first magnet array 410 or the second magnet array 420. According to an embodiment, the magnetic substance 600 may be disposed in the first housing 310, and at least a portion of the magnetic substance 600 may correspond to at least a portion of the second magnet array 420 disposed in the second housing 320. According to another embodiment, the magnetic substance 600 may be disposed in the second housing 320, and at least a portion of the magnetic substance 600 may correspond to at least a portion of the first magnet array 410 disposed in the first housing 310.

According to various embodiments, the magnitude of the magnetism of the magnet array 400 may be varied. According to an embodiment, the magnitude of the magnetic field of the magnet array (e.g., the 2-2th magnet array 428 of FIG. 11) may be smaller than the magnitude of the magnetic field of the 2-1th magnet array 426 corresponding to the other magnet array 416. For example, the 2-2th magnet array 428 may include N35 neodymium magnets, and the 2-1th magnet array 426 may include N52 neodymium magnets. As another example, the length of the 2-2th magnet array 428 may be shorter than the length of the 2-1th magnet array 426.

According to various embodiments, the magnetic substance 600 may include a plurality of magnetic substances. For example, the magnetic substance 600 may include a first magnetic substance (not shown) at least a portion of which corresponds to at least a portion of the 2-1th magnet array 426 and a second magnetic substance (not shown) at least a portion of which corresponds to at least a portion of the 2-2th magnet array 428 in the folded state of the electronic device 101.

According to various embodiments, the first magnet array 410 may form magnetic fields in different directions. For example, the first magnet array 410 may include at least one 1-1th magnet 411 forming a 1-1th magnetic field 411*a* facing the first surface 310*a* of the first housing (e.g., the first housing 310 of FIG. 10), at least one 1-2th magnet 412 forming a 1-2th magnetic field 412*a* facing the second surface 310*b* of the first housing 310, at least one 1-3th magnet 413 forming a 1-3th magnetic field 413*a* in the sixth direction (−Y direction), and at least one 1-4th magnet 414 forming a 1-4th magnetic field 414*a* in the fifth direction (+Y direction). The first magnet array 410 may be disposed in the first housing 310 along the first axial direction (+Y-axis direction). According to an embodiment (e.g., FIG. 12A), the 1-1th magnet 411 and/or the 1-2th magnet 412 may be disposed at an end of the first magnet array 410. For example, the first magnet array 410 may include the 1-2th magnet 412, the 1-4th magnet 414, the 1-1th magnet 411, the 1-3th magnet 413, and the 1-2th magnet 412 arranged in order along the fifth direction (+Y direction). According to another embodiment (e.g., FIG. 12C), the 1-3th magnet 413 and/or the 1-4th magnet 414 may be disposed at the end of the first magnet array 410. For example, the first magnet array 410 may include the 1-4th magnet 414, the 1-1th magnet 411, the 1-3th magnet 413, the 1-2th magnet 412, and the 1-4th magnet 414 arranged in order along the fifth direction (+Y direction).

According to various embodiments, the second magnet array 420 may form magnetic fields in different directions. For example, the second magnet array 420 may include at least one 2-1th magnet 421 forming a 2-1th magnetic field 421*a* facing the fourth surface 320*b* of the second housing structure (e.g., the second housing 320 of FIG. 10), at least one 2-2th magnet 422 forming a 2-2th magnetic field 422*a* facing the third surface 320*a* of the second housing 320, at least one 2-3th magnet 423 forming a 2-3th magnetic field 423*a* in the sixth direction (−Y direction), and at least one 2-4th magnet 424 forming a 2-4th magnetic field 424*a* in the fifth direction (+Y direction). The second magnet array 420 may be disposed in the second housing 320 along the first axial direction (+Y-axis direction). According to an embodiment (e.g., FIG. 12B), the 2-1th magnet 421 and/or the 2-2th magnet 422 may be disposed at an end of the second magnet array 420. For example, the second magnet array 420 may include the 2-2th magnet 422, the 2-4th magnet 423, the 2-1th magnet 421, the 2-4th magnet 424, and the 2-2th magnet 422 arranged in order along the fifth direction (+Y direction). According to another embodiment (e.g., FIG. 12D), the 2-3th magnet 423 and/or the 2-4th magnet 424 may be disposed at the end of the second magnet array 420. For example, the second magnet array 420 may include the 2-3th magnet 423, the 2-2th magnet 422, the 2-3th magnet 423, the 2-2th magnet 422, and the 2-4th magnet 424 arranged in order along the fifth direction (+Y direction).

Figure 12A:
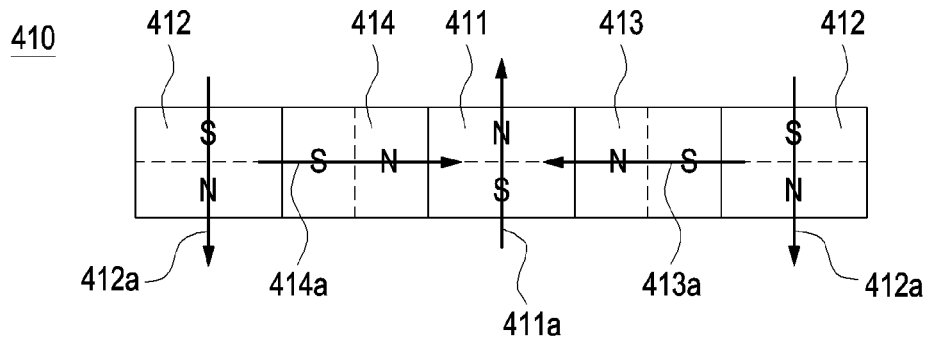
FIGS. 12A, 12B, 12C, and 12D are views schematically illustrating a magnet array according to various embodiments of the disclosure.
Figure 12B:
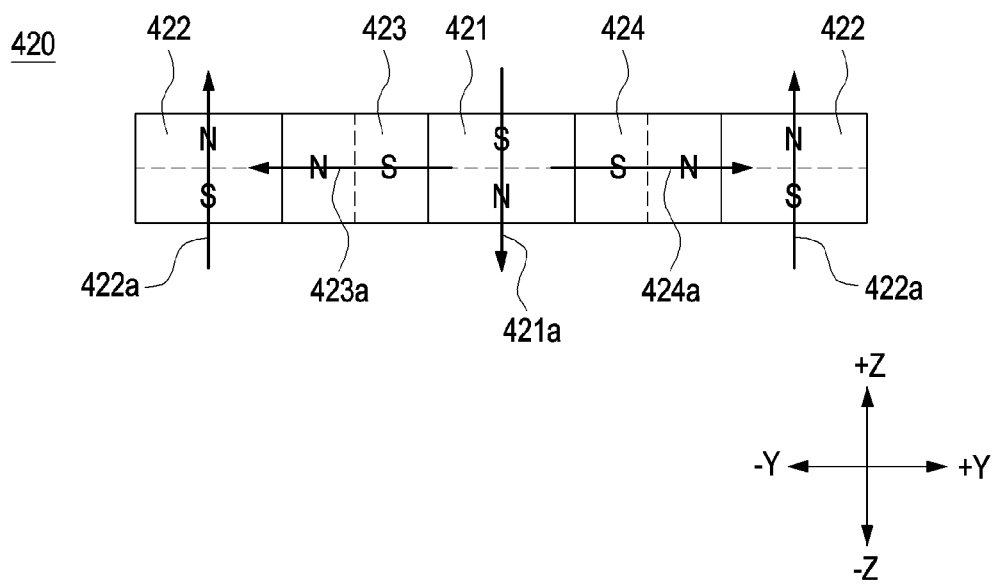
Figure 12C:
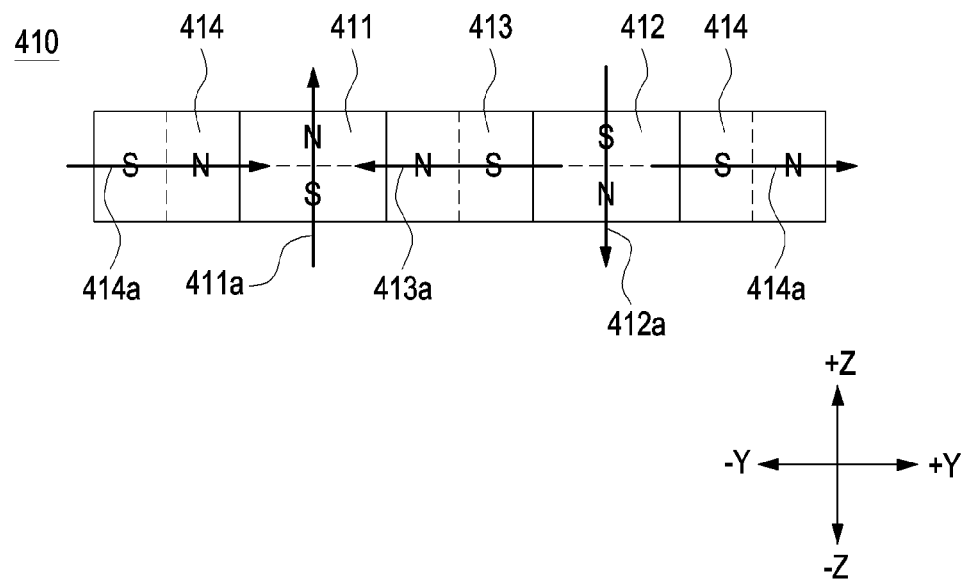
Figure 12D:
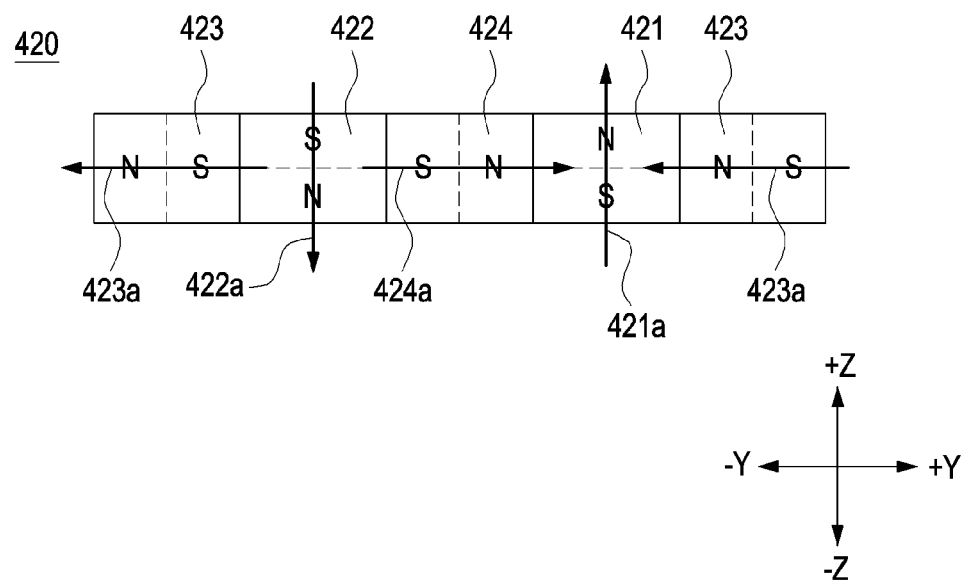

According to various embodiments, the first magnet array 410 and the second magnet array 420 may include a plurality of magnets. For example, although the magnet array 400 including five magnets is illustrated in FIGS. 12A and 12B, this is for convenience of description, and the first magnet array 410 and the second magnet array 420 may include more than five magnets. According to an embodiment, the configuration of the first magnet array 410 and the second magnet array 420 of FIGS. 12A, 12B, 12C, and 12D may be interpreted as views in which the magnet arrays 410 and 420 are arranged in the electronic device 101 (e.g., FIG. 3) in the folded state.

Figure 13:
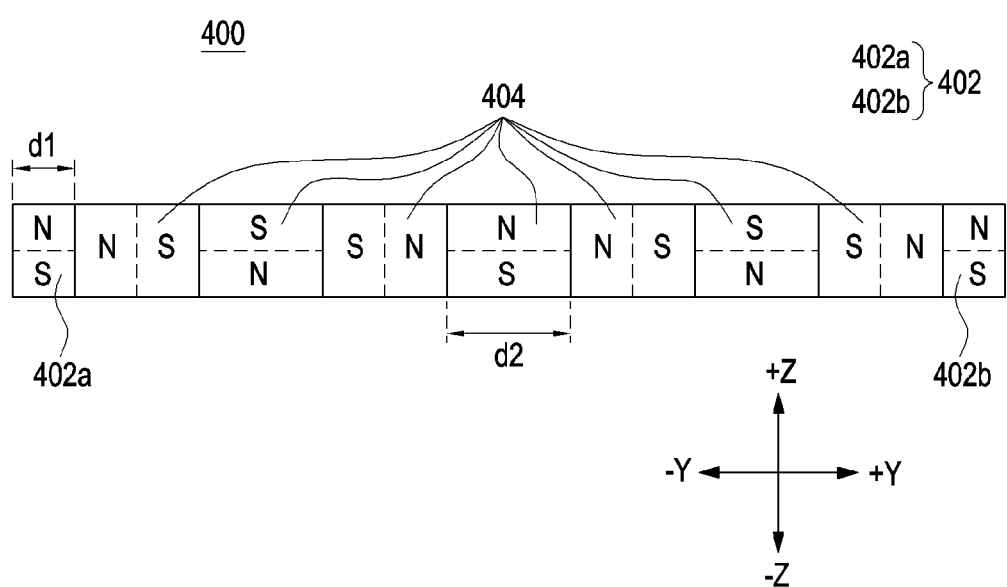
FIG. 13 is a view schematically illustrating a magnet array including an end magnet according to an embodiment of the disclosure.

FIG. 13 is a view schematically illustrating a magnet array including an end magnet according to an embodiment of the disclosure.

Referring to FIG. 13, the magnet array 400 may include a plurality of end magnets 402 and a plurality of center magnets 404 positioned between the plurality of end magnets 402. The configuration of the magnet array 400 of FIG. 13 may be identical in whole or part to the configuration of the magnet array 400 of FIGS. 7 and 8.

According to various embodiments, the end magnets 402 may form two opposite ends of the magnet array 400. For example, the end magnets 402 may include a first end magnet 402a positioned at the end in the sixth direction (−Y direction) of the magnet array 400 and a second end magnet 402b positioned at the end in the fifth direction (+Y direction) of the magnet array 400. According to an embodiment (e.g., FIG. 13), the end magnets 402a and 402b may form a magnetic field in a direction towards the front surface (e.g., the first surface 310a or third surface 320a of FIG. 2) of the electronic device (e.g., the electronic device 101 of FIG. 2) and/or the rear surface (e.g., the second surface 310b or fourth surface 320b of FIG. 2) of the electronic device 101. For example, the end magnets 402a and 402b may form a magnetic field in the third direction (+Z direction) or fourth direction (−Z direction). According to another embodiment (not shown), the end magnets 402a and 402b may form a magnetic field in a direction substantially perpendicular to the front surface 310a or 320a or the rear surface 310b or 320b of the electronic device 101. For example, the end magnets 402a and 402b may form a magnetic field in the fifth direction (+Y direction) or sixth direction (−Y direction).

According to various embodiments, the size of the end magnet 402 may vary. For example, the second width d2 of the plurality of center magnets 404 may be larger than the first width d1 of the end magnets 402. According to an embodiment, the second width d2 may be substantially equal to twice the first width d1.

Figure 14:
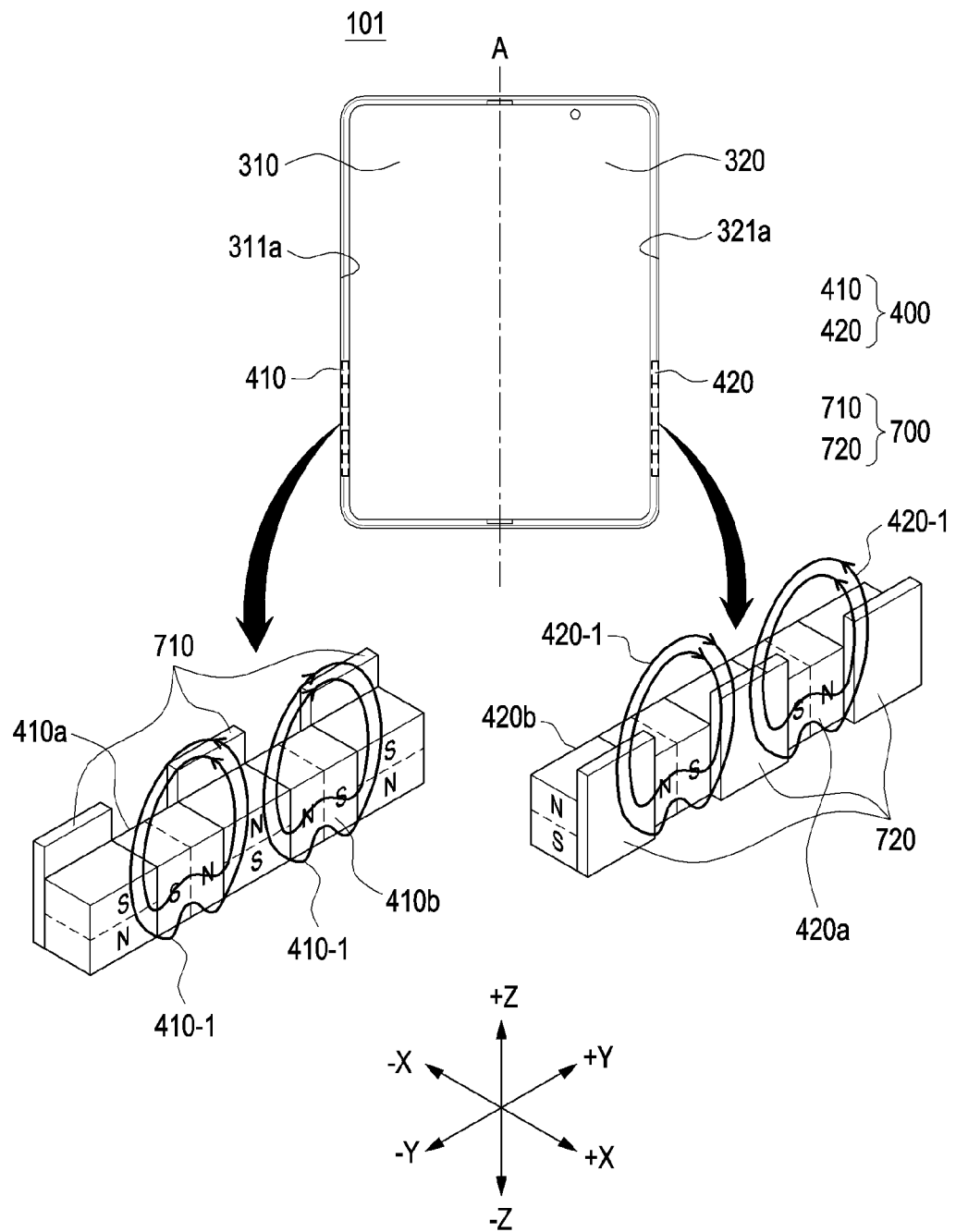
FIG. 14 is a front view illustrating an electronic device including a guide member according to an embodiment of the disclosure.
Figure 15:
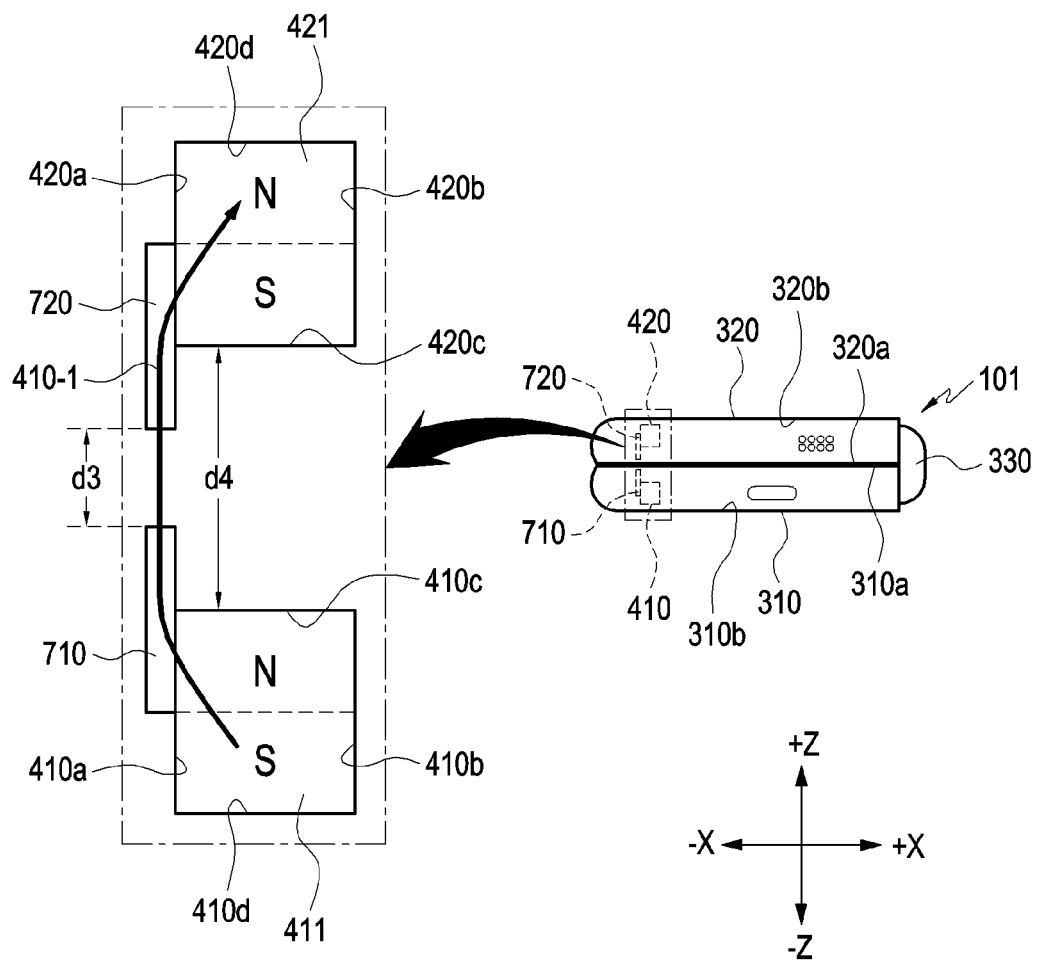
FIG. 15 is a view schematically illustrating a magnetic field of a magnet array according to an embodiment of the disclosure.

FIG. 14 is a front view illustrating an electronic device including a guide member according to an embodiment of the disclosure. FIG. 15 is a view schematically illustrating a magnetic field of a magnet array according to an embodiment of the disclosure.

Referring to FIGS. 14 and 15, an electronic device 101 may include a magnet array 400 and a guide member 700. The configuration of the magnet array 400 of FIGS. 14 and 15 may be identical in whole or part to the configuration of the magnet array 400 of FIGS. 7 and 8. According to various embodiments, the magnet array 400 may include a surface facing the edge (e.g., the first side surface 311a or the second side surface 321a) of the electronic device 101. For example, the first magnet array 410 may include a fifth surface 410a facing the first side surface 311a of the first housing 310 and a sixth surface 410b opposite to the fifth surface, and the second magnet array 420 may include a seventh surface 420a facing the second side surface 321a of the second housing 320 and an eighth surface 420b opposite to the seventh surface. According to an embodiment, the first magnet array 410 may include at least one of a ninth surface 410c facing the first surface 310a and a tenth surface 410d facing the second surface 310b. According to an embodiment, the second magnet array 420 may include at least one of an eleventh surface 420c facing the third surface 320a or a twelfth surface 420d facing the fourth surface 320b.

According to various embodiments, the guide member 700 may guide the direction of the magnetic field formed by the magnet array 400. For example, at least a portion of the magnetic field formed by the magnet array 400 may be moved along the guide member 700.

According to various embodiments, the guide member 700 may be formed to have a structure capable of adjusting the direction of the magnetic field of the magnet array 400. For example, in the folded state of the electronic device 101, a third distance d3 which is the distance between the first guide member 710 and the second guide member 720 may be shorter than a fourth distance d4 which is the distance between the first magnet array 410 and the second magnet array 420. The first magnetic field 410-1 formed by the first magnet array 410 may be transferred to the second guide member 720 and the second magnet array 420 along the first guide member 710. Although FIG. 15 illustrates that the magnetic field formed from the N pole of a portion (e.g., the 1-1th magnet 411) of the first magnet array 410 is transferred to the S pole of a portion (e.g., the 2-1th magnet 421) of the second magnet array 420, in another embodiment (not shown), the magnetic field formed by the N pole of the second magnet array 420 may be transferred to the S pole of the first magnet array 410.

According to an embodiment, the guide member 700 may increase the ratio of the magnetic field transferred to the second magnet array 420 to the magnetic field from the first magnet array 410. According to another embodiment, the guide member 700 may increase the ratio of the magnetic field transferred to the first magnet array 410 to the magnetic field of the second magnet array 420. For example, the guide member 700 may guide the direction of the magnetic field so that the magnitude of the magnetic field of the magnet array 400 in the height direction (e.g., Z-axis direction) is larger than the magnitude of the magnetic field of the magnet array 400 in the horizontal direction (e.g., X-axis direction).

According to various embodiments, the guide member 700 may be disposed on the magnet array 400. According to an embodiment, the first guide member 710 may be disposed on the fifth surface 410a (seventh direction (−X direction)) of the first magnet array 410 facing the first side surface 311a, and the second guide member 720 may be disposed on the seventh surface 420a (seventh direction (−X direction)) of the second magnet array 420 facing the second side surface 321a. According to an embodiment, the first guide member 710 may be disposed between the first side surface 311a of the first housing 310 and the first magnet array 410, and the second guide member 720 may be disposed between the second side surface 321a of the second housing 320 and the second magnet array 420.

According to various embodiments, the guide member 700 may cover at least a portion of the magnet array 400. According to an embodiment, the first guide member 710 may cover a portion of the fifth surface 410a of the first magnet array 410, and the second guide member 720 may cover a portion of the seventh surface 420a of the second magnet array 420. For example, the first guide member 710 may extend up to a virtual boundary dividing the N pole and S pole of the first magnet array 410 to cover the area of the N pole and the area of the S pole, and the second guide member 720 may extend up to a virtual boundary dividing the N pole and S pole of the second magnet array 420 to cover the area of the N pole and the area of the S pole.

According to various embodiments, the guide member 700 may be disposed on at least some of the plurality of magnets of the magnet array 400. For example, the guide member 700 may be disposed on the magnet forming the magnetic field facing the front surface (e.g., the first surface or third surface) or rear surface (e.g., the second surface or fourth surface). According to an embodiment, the first guide member 710 may be disposed on at least a portion of the 1-1th magnet 411 and the 1-2th magnet 412, and the second guide member 720 may be disposed on at least a portion of the 2-1th magnet 421 and the 2-2th magnet 422.

According to various embodiments, the guide member 700 may include a magnetic material. For example, the guide member 700 may include at least one of ferritic stainless steel (e.g., stainless steel 430) or martensitic stainless steel (e.g., stainless steel).

Figure 16A:
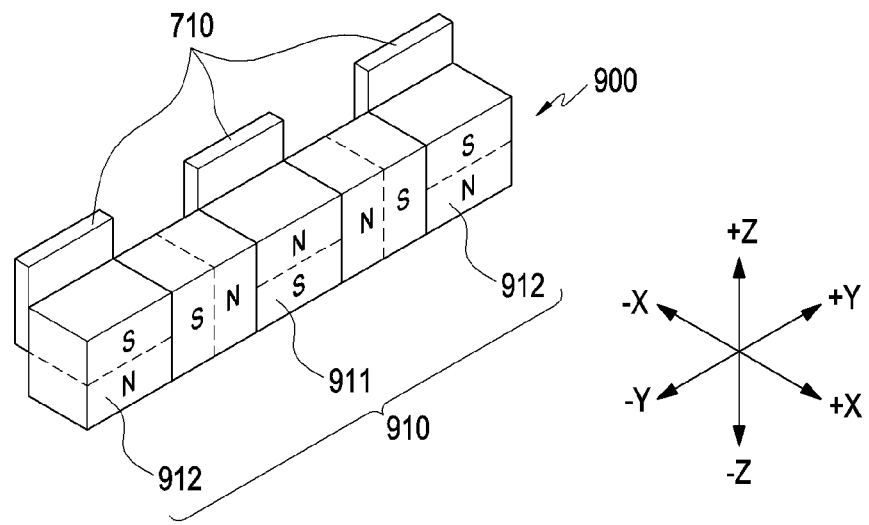
FIGS. 16A and 16B are perspective views illustrating a magnet array having a guide member according to various embodiments of the disclosure.
Figure 16B:
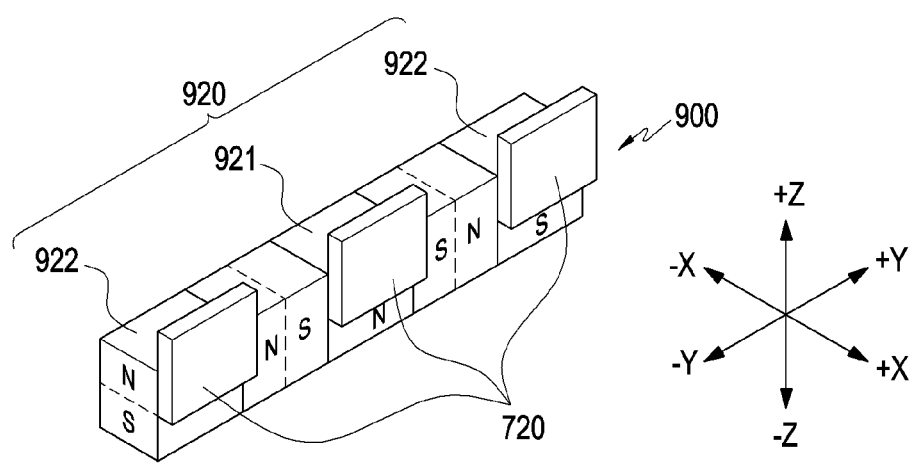
Figure 17A:
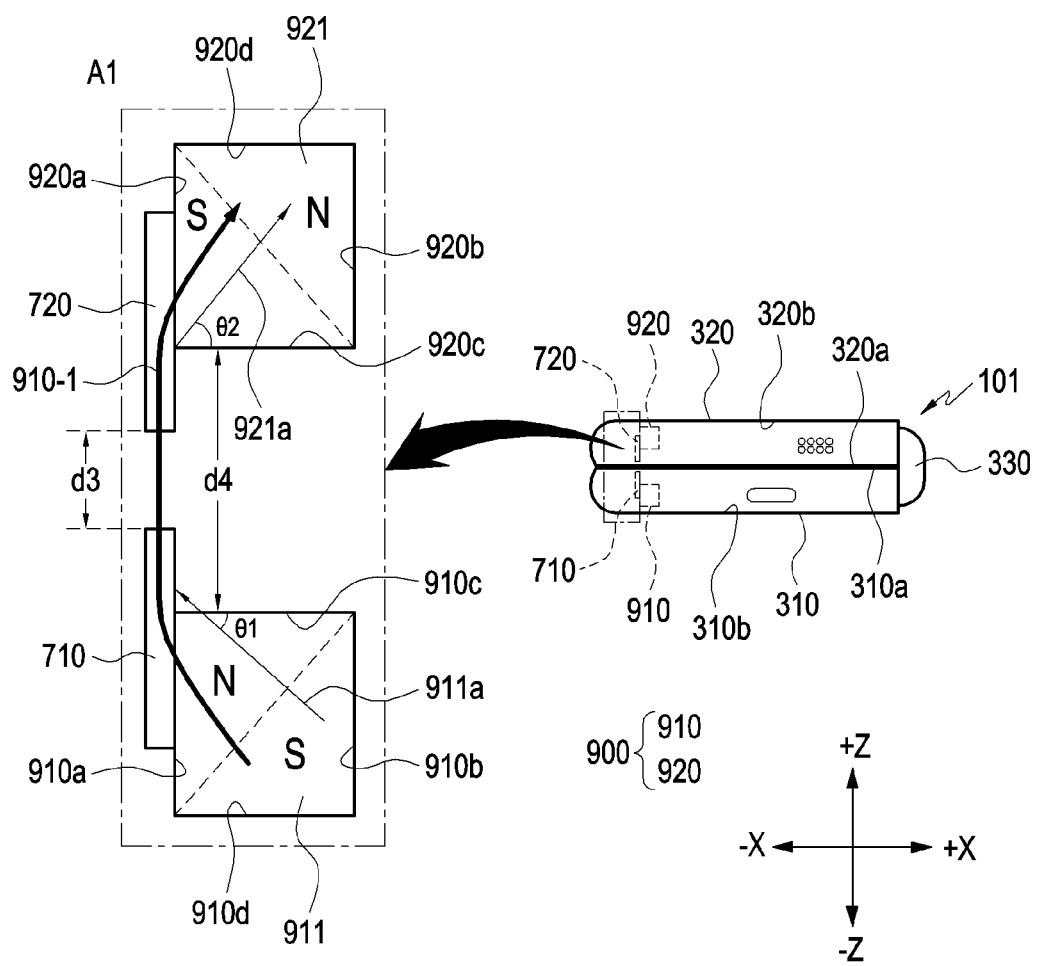
FIGS. 17A and 17B are views schematically illustrating a magnetic field of a magnet array according to various embodiments of the disclosure.
Figure 17B:
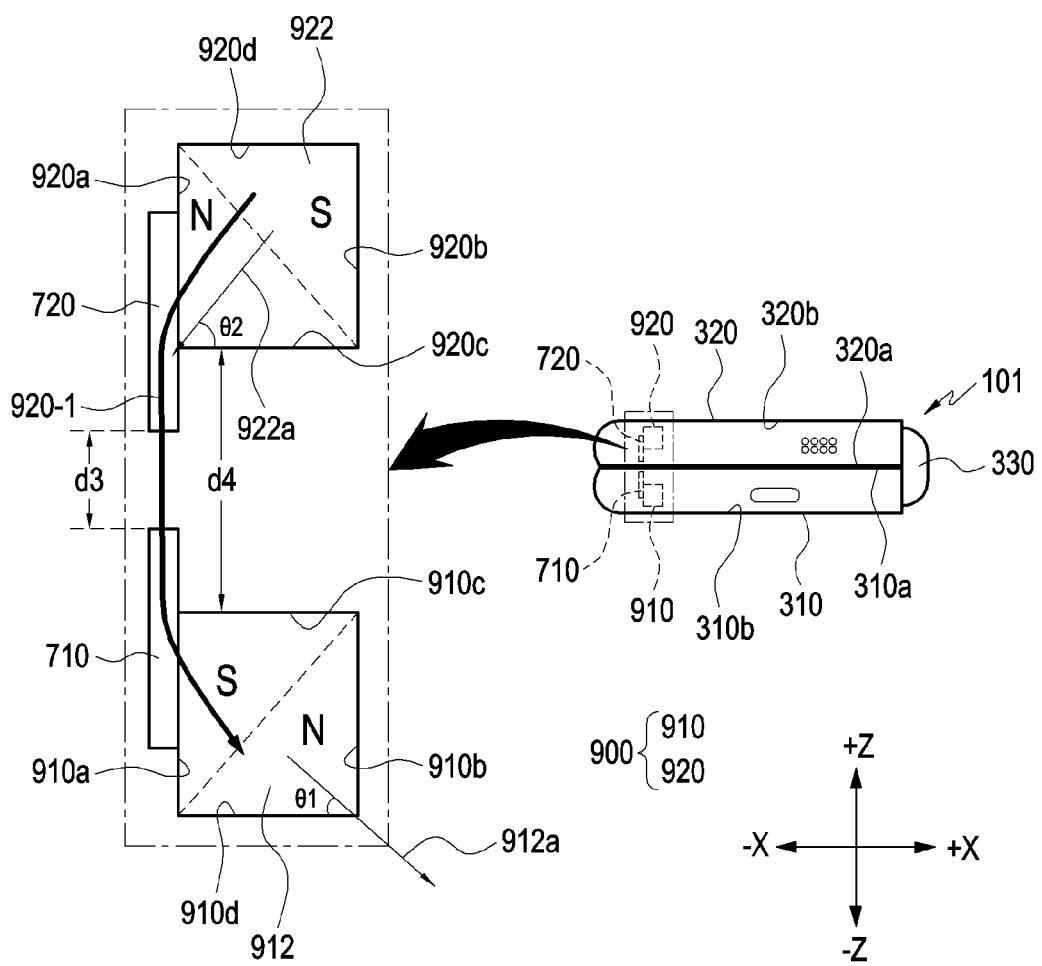
Figure 17C:
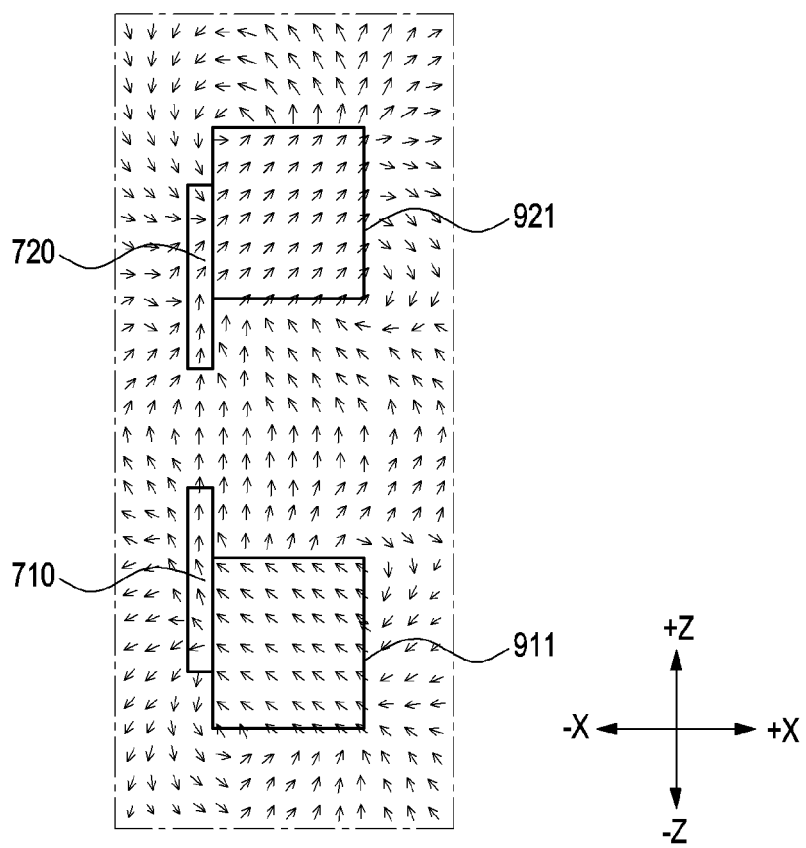
FIG. 17C is a view schematically illustrating a first magnetic field area of FIG. 17A according to an embodiment of the disclosure.

FIGS. 16A and 16B are perspective views illustrating a magnet array having a guide member according to various embodiments of the disclosure. FIGS. 17A and 17B are views schematically illustrating a magnetic field of a magnet array according to various embodiments of the disclosure. FIG. 17C is a view schematically illustrating a first magnetic field area of FIG. 17A according to an embodiment of the disclosure.

Referring to FIGS. 16A, 16B, 17A, 17B, and 17C, an electronic device 101 may include a magnet array 900 and a guide member 700. The configuration of the magnet array 900 and guide member 700 of FIGS. 16A, 16B, 17A, and 17B may be identical in whole or part to the configuration of the magnet array 400 and guide member 700 of FIG. 14.

According to various embodiments, the magnet array 900 may form a magnetic field at an inclined angle with respect to the foldable housing (e.g., the foldable housing 300 of FIG. 2). For example, the magnet array 900 may generate a magnetic field that generates an attractive force between the first housing 310 and the second housing 320. According to an embodiment, a 1-1th magnetic field 910-1 may be transferred from the magnet (e.g., the 1-1th magnet 911) of the first magnet array 910 to the magnet (e.g., the 2-1th magnet 921) of the second magnet array 920 through the first guide member 710 and the second guide member 720. For example, in the unfolded state of the electronic device 101, the magnet array 900 may form a first magnetic field area A1 that generates an attractive force between the first magnet array 910 and the second magnet array 920. The first magnetic field area A1 may be a plurality of magnetic fields that are transferred from the 1-1th magnet 911 through the first guide member 710, the second guide member 720, and an empty space to the 2-1th magnet 921. The size in the height direction (e.g., Z-axis direction) of the first magnetic field area A1 may be larger than the size in the width direction (e.g., X-axis direction). According to another embodiment, a second magnetic field 920-1 may be transferred from the magnet (e.g., the 2-2th magnet 922) of the second magnet array 920 to the magnet (e.g., the 1-2th magnet 912) of the first magnet array 910 through the second guide member 720 and the first guide member 710.

According to various embodiments, the first magnet array 910 may form a magnetic field toward the first surface 310a and the second surface 310b of the first housing 310 at an inclined angle. According to an embodiment, the 1-1th magnetic field 911a formed by the first magnet array 910 may be formed to form a first designated angle θ1 from the first surface 310a of the first housing 310. For example, the 1-1th magnet 911 may be configured to transfer the 1-1th magnetic field 911a at the first designated angle θ1 to the second magnet array 920 through the first face 310a. The N pole of the 1-1th magnet 911 may be positioned along the fifth surface 910a and the ninth surface 910c of the first magnet array 910, and the S pole of the 1-1th magnet 911 may be positioned along the sixth surface 910b and the tenth surface 910d. According to an embodiment, the 1-2th magnetic field 912a formed by the first magnet array 910 may be formed to form the first designated angle θ1 from the second surface 310b of the first housing 310. For example, the 1-2th magnet 912 may transfer the 1-2th magnetic field 912a to the second surface 310b at the first designated angle θ1. The N pole of the 1-2th magnet 912 may be positioned along the sixth surface 910b and the tenth surface 910d of the first magnet array 910, and the S pole of the 1-2th magnet 912 may be positioned along the fifth surface 910a and the ninth surface 910c of the first magnet array 910. The first designated angle θ1 may be 10 degrees to 80 degrees, preferably 30 degrees to 60 degrees.

According to various embodiments, the second magnet array 920 may form a magnetic field toward the third surface 320a and the fourth surface 320b of the second housing 320 at an inclined angle. According to an embodiment, the 2-1th magnetic field 921a formed by the second magnet array 920 may be formed to form a second designated angle θ2 from the fourth surface 320b of the second housing 320. The 2-1th magnet 921 may be configured such that the 2-1th magnetic field 921a is transferred to the third surface 320a at the second designated angle θ2. For example, the N pole of the 2-1th magnet 921 may be positioned along the eighth surface 920b and the eleventh surface 920c of the second magnet array 920. The 2-1th magnetic field 921a may overlap the 1-1th magnetic field 911a, increasing the attractive force formed between the first magnet array 910 and the second magnet array 920. According to an embodiment, the 2-2th magnetic field 922a formed by the second magnet array 920 may be formed to form the second designated angle θ2 from the third surface 320a of the second housing 320. For example, the 2-2th magnet 922 may be configured to transfer the 2-2th magnetic field 922a to the fourth surface 320b of the second housing 320 at the second designated angle θ2. The N pole of the 2-2th magnet 922 may be positioned along the seventh surface 920a and the eleventh surface 920c of the second magnet array 920, and the S pole of the 2-2th magnet 922 may be positioned along the eighth surface 920b and the twelfth surface 920d of the second magnet array 920. The second designated angle θ2 may be 10 degrees to 80 degrees, preferably 30 degrees to 60 degrees. The 2-2th magnetic field 922a may overlap the 1-2th magnetic field 912a, increasing the attractive force formed between the first magnet array 910 and the second magnet array 920. According to an embodiment, the second designated angle θ2 may be substantially the same as the first designated angle θ1.

FIGS. 18A, 18B, 18C, and 18D are views schematically illustrating a magnet array according to various embodiments of the disclosure.

Referring to FIGS. 18A, 18B, 18C, and 18D, a magnet array 1001 may include a plurality of magnets. According to an embodiment, the configuration of the magnet array 1001 of FIGS. 18A to 18D may be identical in whole or part to the configuration of the magnet array 400 of FIGS. 9A, 9B, 10, 11, 12A to 12D, 13, 14, and 15. According to another embodiment, the configuration of the magnet array 1001 of FIGS. 18A to 18D may be identical in whole or part to the configuration of the magnet array 900 of FIGS. 16A, 16B, and 17A to 17C. For example, at least a portion of the magnetic field in the vertical direction (Z-axis direction) may be an inclined magnetic field.

Referring to FIGS. 18A, 18B, 18C, and 18D, an electronic device (e.g., the electronic device 101 of FIG. 2) may include a first magnet array 1010 and a second magnet array 1020. The configuration of the first magnet array 1010 and the second magnet array 1020 may be identical in whole or part to the configuration of the first magnet array 410 and the second magnet array 420 of FIGS. 9A, 9B, 10, 11, 12A to 12D, 13, 14, and 15.

According to various embodiments, the first magnet array 1010 may include magnets that form magnetic fields in different directions. For example, the first magnet array 1010 may include at least one 1-1th magnet 1011 forming a 1-1th magnetic field 1011a in the first direction (+Z direction), at least one 1-2th magnet 1012 forming a 1-2th magnetic field 1012a in the second direction (−Z direction), at least one 1-3th magnet 1013 forming a 1-3th magnetic field 1013a in the sixth direction (−Y direction), and a 1-4th magnet 1014 forming a 1-4th magnetic field 1014a in the fifth direction (+Y direction) in the unfolded state of the electronic device (e.g., the electronic device 101 of FIG. 2). The configuration of the 1-1th magnet 1011, 1-2th magnet 1012, 1-3th magnet 1013, and 1-4th magnet 1014 may be identical in whole or part to the configuration of the 1-1th magnet 411, the 1-2th magnet 411, the 1-3th magnet 413, and the 1-4th magnet 414, respectively.

According to various embodiments, the second magnet array 1020 may include magnets that form magnetic fields in different directions. For example, the second magnet array 1020 may include at least one 2-1th magnet 1021 forming a 2-1th magnetic field 1021a in the fourth direction (−Z direction), at least one 1-2th magnet 1012 forming a 2-2th magnetic field 1022a in the third direction (+Z direction), at least one 2-3th magnet 1023 forming a 2-3th magnetic field 1023a in the sixth direction (−Y direction), and a 2-4th magnet 1024 forming a 2-4th magnetic field 1024a in the fifth direction (+Y direction) in the unfolded state of the electronic device (e.g., the electronic device 101 of FIG. 2).The configuration of the 2-1th magnet 1021, 2-2th magnet 1022, 2-3th magnet 1023, and 2-4th magnet 1024 may be identical in whole or part to the configuration of the 2-1th magnet 421, the 2-2th magnet 422, the 2-3th magnet 423, and the 2-4th magnet 424, respectively.

According to various embodiments, in the unfolded state of the electronic device (e.g., the electronic device 101 of FIG. 3), the direction of the magnetic field formed by the magnets of the first magnet array 1010 may differ from the direction of the magnetic field formed by the magnets of the second magnet array 1020. In the folded state of the electronic device (e.g., the electronic device 101 of FIG. 2), a portion (e.g., the 1-1th magnet 1011 and the 1-2th magnet 1012) of the first magnet array 1010 may generate a magnetic field in the same direction as a portion (e.g., the 2-1th magnet 1021 and the 2-2th magnet 1022) of the second magnet array 1020, and another portion (e.g., the 1-3th magnet 1013 and the 1-4th magnet 1014) of the first magnet array 1010 may generate a magnetic field in a direction opposite to another portion (e.g., the 2-4th magnet 1024 and the 2-3th magnet 1023) of the second magnet array 1020. For example, when the electronic device 101 is folded, the direction of the magnetic field generated by the 2-1th magnet 1021 of the second magnet array 1020 may be the same as the direction of the magnetic field generated by the 1-1th magnet array 1011, and the direction of the magnetic field generated by the 2-2th magnet 1022 may be the same as the direction of the magnetic field generated by the 1-2th magnet 1012. According to an embodiment, when the electronic device 101 is folded, the 1-1th magnet 1011 may face the 2-1th magnet 1021, the 1-2th magnet 1012 may face the 2-2th magnet 1022, the 1-3th magnet 1013 may face the 2-4th magnet 1024, and the 1-4th magnet 1014 may face the 2-3th magnet 1023.

According to various embodiments, the first magnet array 1010 and the second magnet array 1020 may include various numbers of magnets. For example, referring to FIGS. 18A, 18B, 18C, and 18D, the first magnet array 1010 and the second magnet array 1020 each may include 7, 9, 11, or 13 magnets. The number of the magnets that the first magnet array 1010 and the second magnet array 1020 may include is not limited to the numbers of magnets shown in FIGS. 18A, 18B, 18C, and 18D. For example, the first magnet array 1010 and the second magnet array 1020 each may include more than 13 magnets or 6 or less magnets.

According to various embodiments, if the magnet array 1001 meets a three-dimensional multipolar array (e.g., Halbach array), some of the plurality of magnets included in the magnet array 1001 may be excluded. According to an embodiment, the 1-2th magnet 1012 disposed at the end in the fifth direction (+Y direction) and the 1-1th magnet 1011 disposed at the end in the sixth direction (−Y direction) of FIG. 18C may be excluded.

Figure 19:
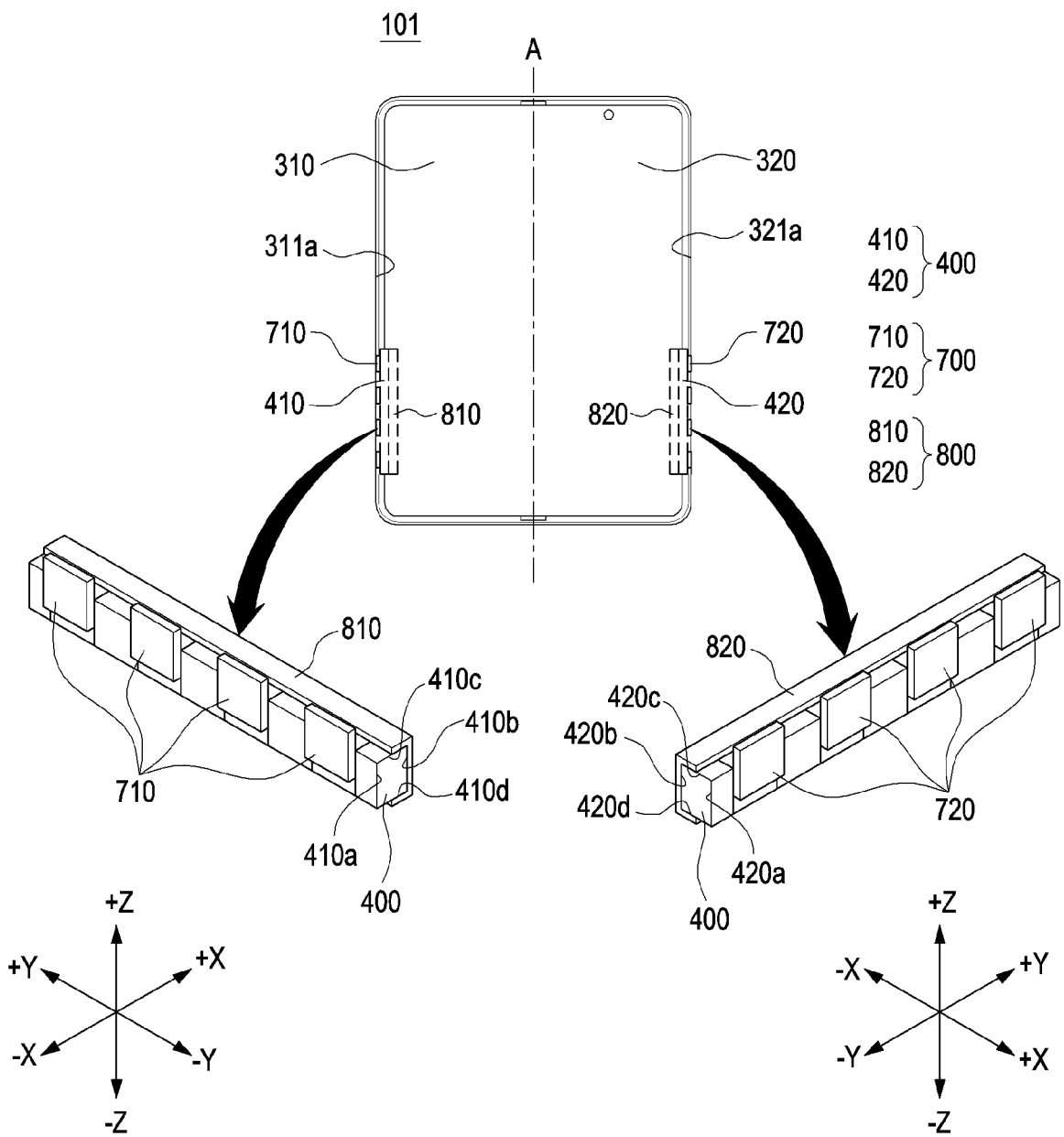
FIG. 19 is a front view illustrating an electronic device including a guide member and a shielding member according to an embodiment of the disclosure.

FIG. 19 is a front view illustrating an electronic device including a magnet array, a guide member and a shielding member according to an embodiment of the disclosure. FIGS. 20A, 20B, 20C, and 20D are perspective views illustrating a magnet array having a guide member and a shielding member according to various embodiments of the disclosure.

Referring to FIGS. 19, 20A, 20B, 20C, and 20D, the guide member 700 and the shielding member 800 may be disposed on the magnet array 400. For example, the first guide member 710 and the first shielding member 810 may be disposed on the first magnet array 410, and the second guide member 720 and the second shielding member 820 may be disposed on the second magnet array 420. The configuration of the magnet array 400 of FIGS. 19, 20A, 20B, 20C, and 20D may be identical in whole or part to the configuration of the magnet array 400 of FIGS. 18A to 18D. The configuration of the guide member 700 may be identical in whole or part to the configuration of the guide member 700 of FIGS. 14, 15, 16A, and 16B.

Figure 18A:
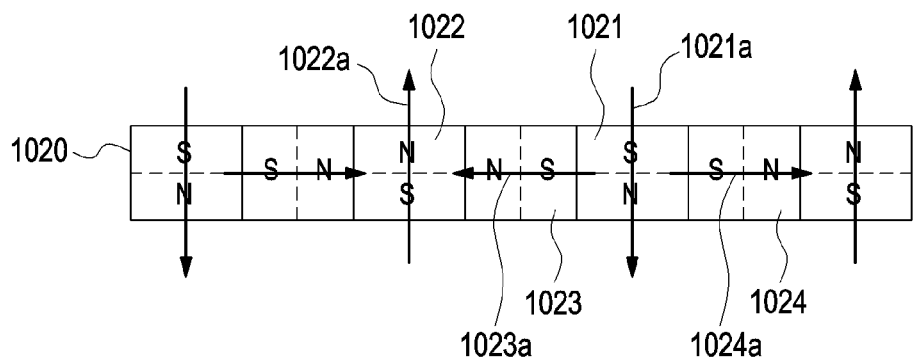
FIGS. 18A, 18B, 18C, and 18D are views schematically illustrating a magnet array according to various embodiments of the disclosure.
Figure 18A:
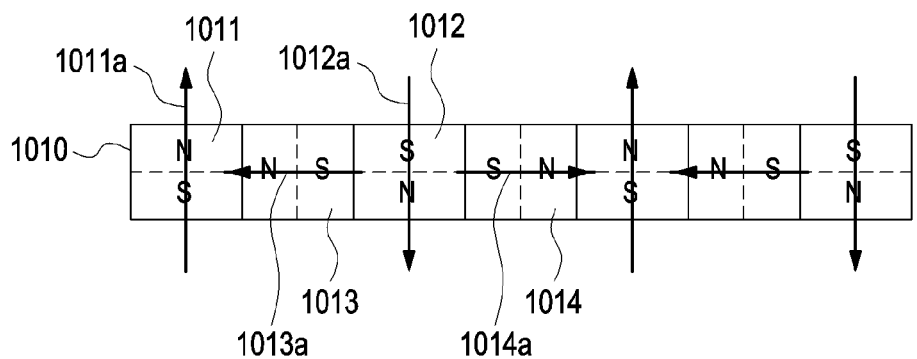
Figure 18A:
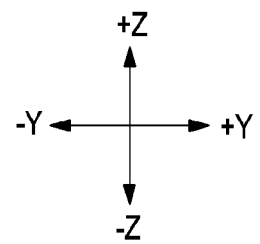
Figure 18B:
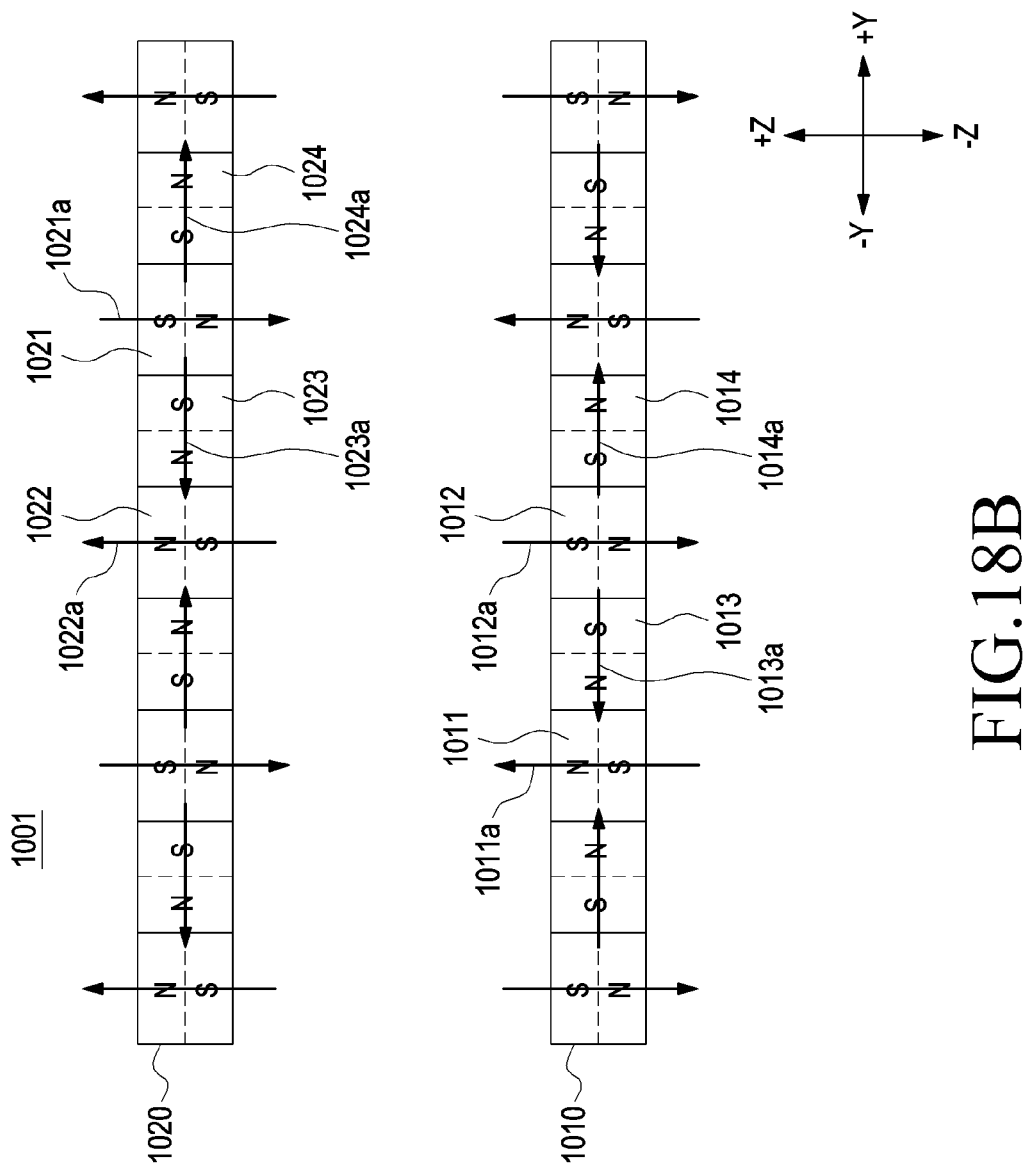
Figure 18C:
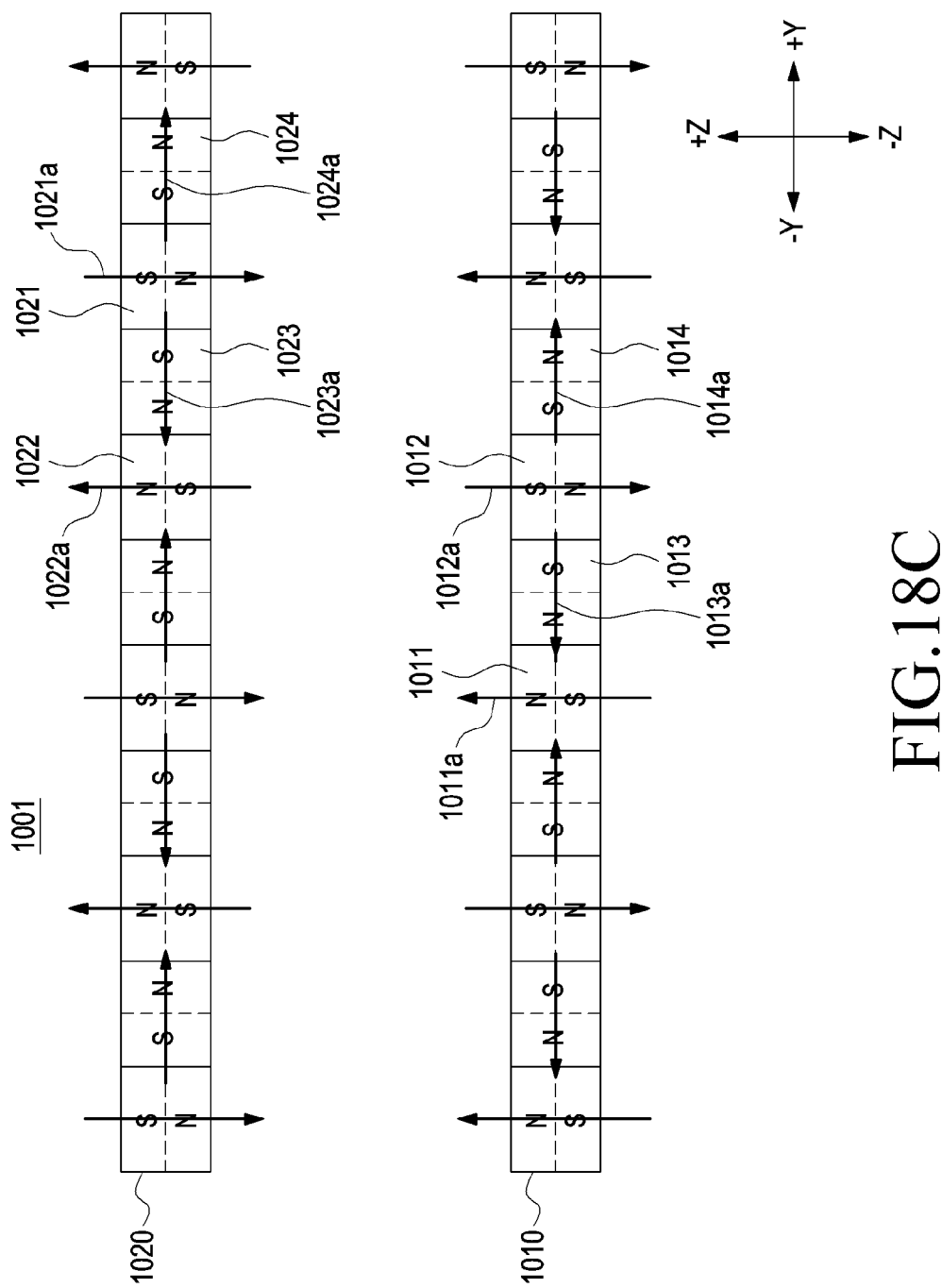
Figure 18D:
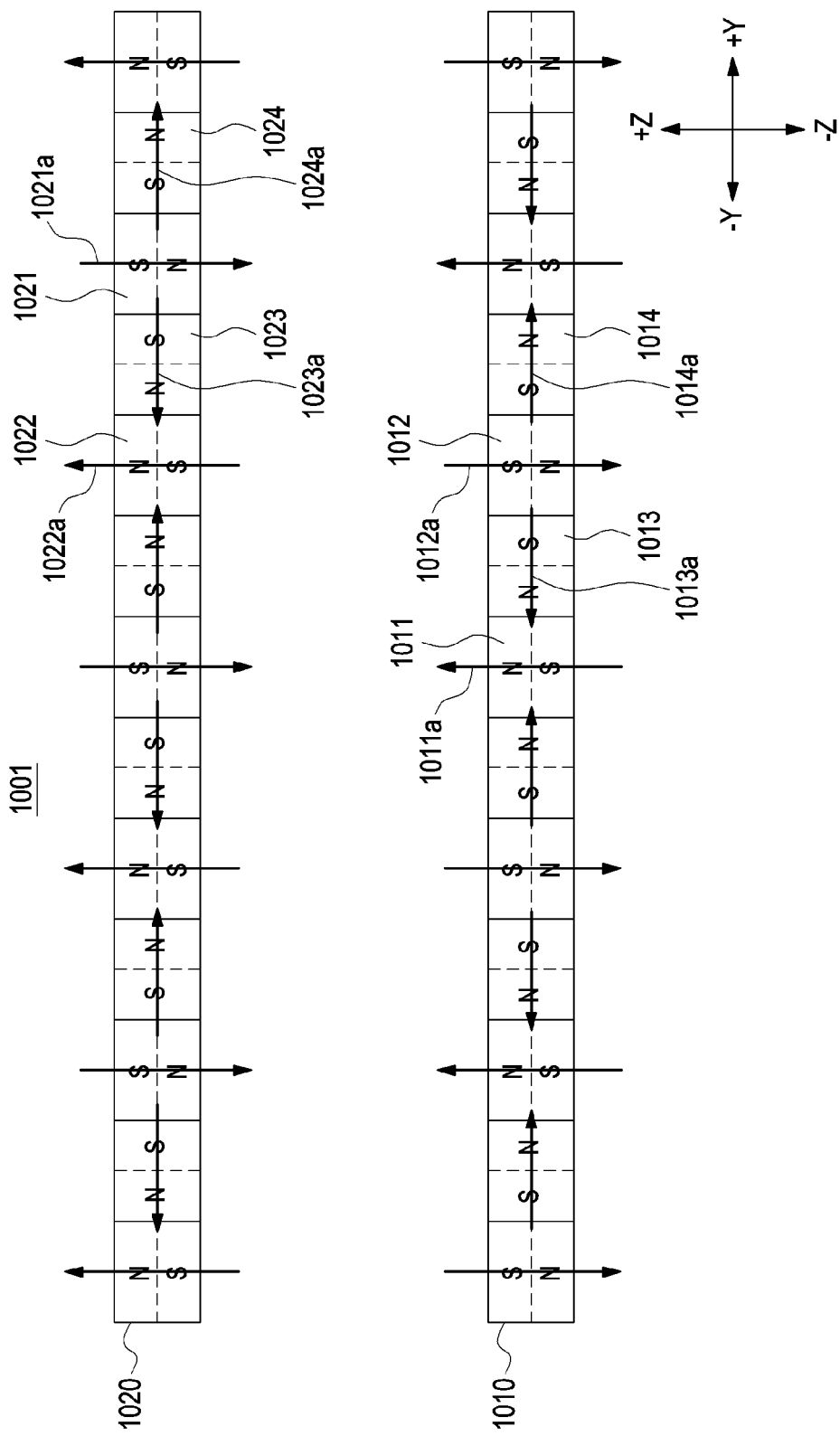

According to various embodiments, the magnet array 400 may include magnets disposed in various arrays. According to an embodiment, the first magnet array 410 may have the same configuration as the first magnet array 1010 in which the 1-2th magnet 1012 disposed at the end in the fifth direction (+Y direction) and the 1-1th magnet 1011 disposed at the end in the sixth direction (−Y direction) in the first magnet array 1010 of FIG. 18C are excluded, and the second magnet array 420 may have the same configuration as the second magnet array 1020 in which the 2-2th magnet 1022 disposed at the end in the fifth direction (+Y direction) and the 2-1th magnet 1021 disposed at the end in the sixth direction (−Y direction) are excluded in the second magnet array 1020 of FIG. 18C.

According to various embodiments, the shielding member 800 may adjust the direction and magnitude of the magnetic field formed by the magnet array 400. For example, the shielding member 800 may reduce the magnitude at which at least a portion of the magnetic field formed by the magnet array 400 is transferred to an internal component (e.g., the pen driving circuit 500 of FIG. 5) of the electronic device 101. For example, the shielding member 800 may be disposed to surround at least a portion of the magnet array 400 in a direction towards the inside of the electronic device 101. According to an embodiment, the shielding member 800 may be disposed to surround at least a portion of the sixth surface 410*b* of the first magnet array 410 and at least a portion of the eighth surface 420*b* of the second magnet array 420. According to an embodiment, the shielding member 800 may include a first shielding member 810 disposed in the first magnet array 410 and a second shielding member 820 disposed in the second magnet array 420. According to an embodiment, the magnetic field may be formed along at least one of the shielding member 800, the guide member 700, or the magnet array 400.

Figure 20A:
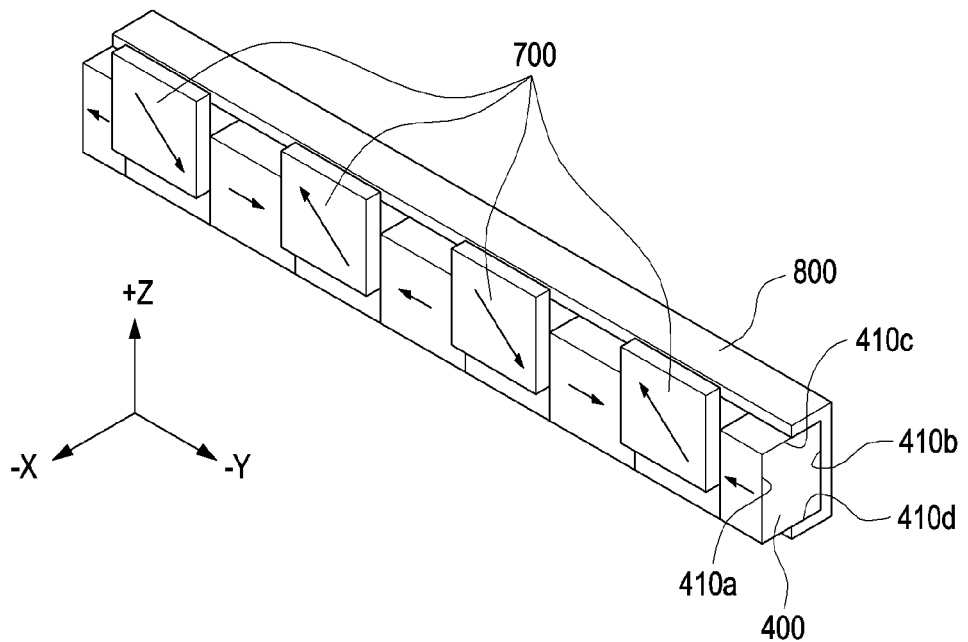
FIGS. 20A, 20B, 20C, and 20D are perspective views illustrating a magnet array having a guide member and a shielding member according to various embodiments of the disclosure.
Figure 20B:
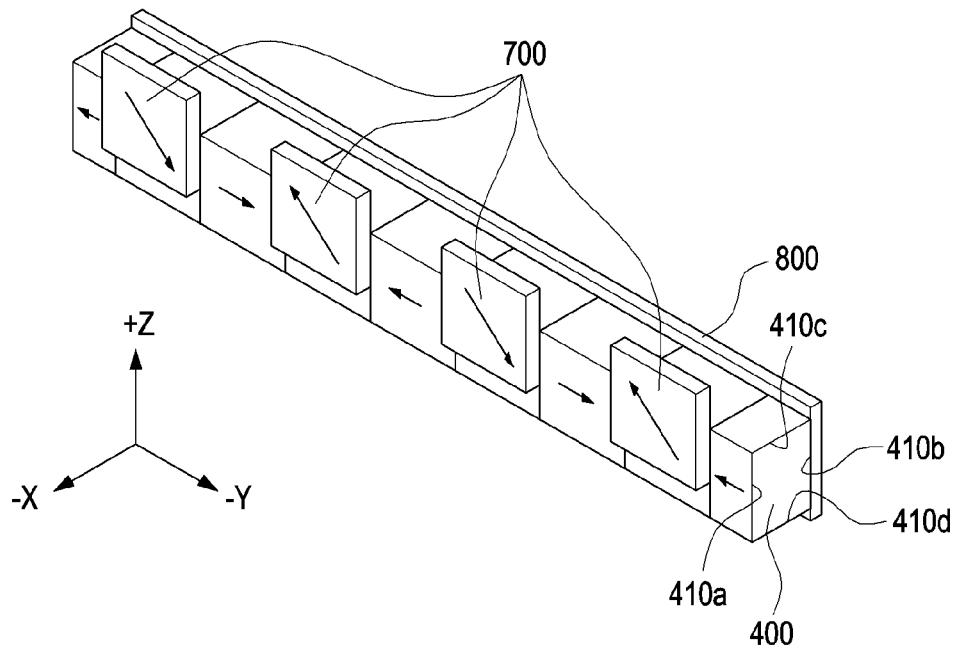
Figure 20C:
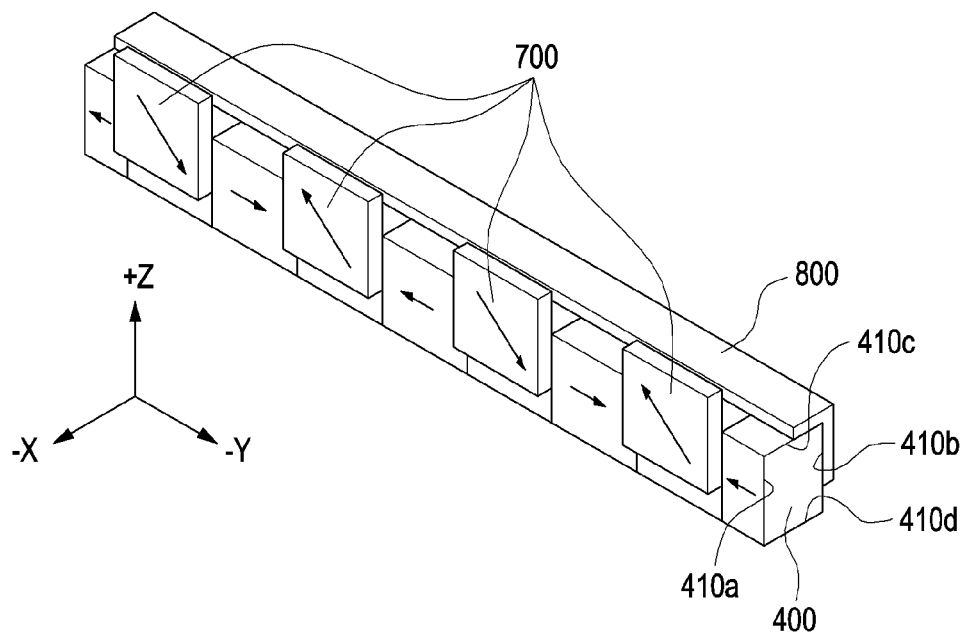
Figure 20D:
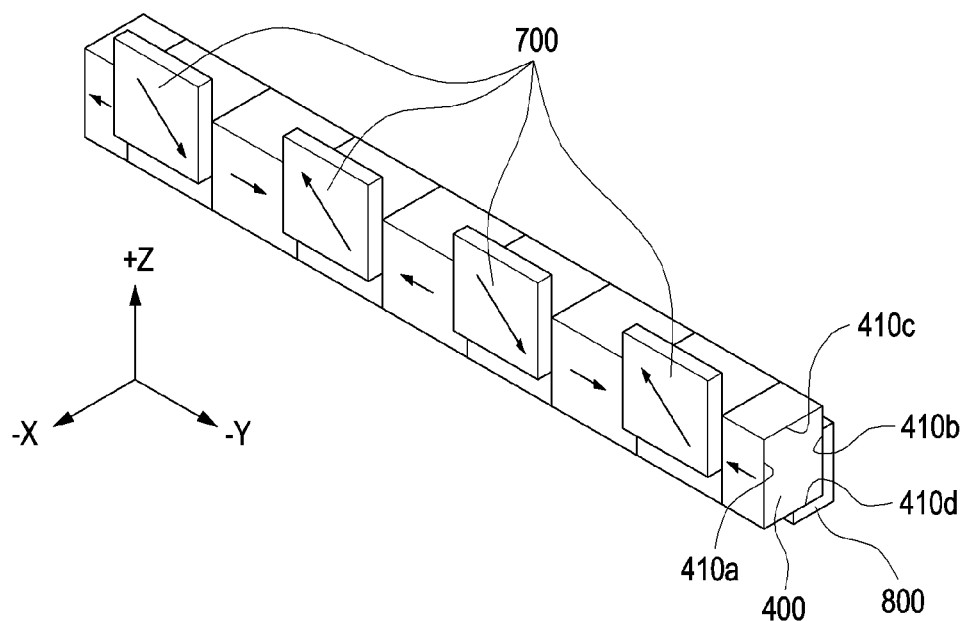

According to various embodiments, the shielding member 800 may surround at least a portion of the magnet array 400. Referring to FIG. 20A, the shielding member 800 may surround the sixth surface 410*b* of the magnet array 400, a portion of the ninth surface 410*c*, and a portion of the tenth surface 410*d*. Referring to FIG. 20B, the shielding member 800 may surround the sixth surface 410*b* of the magnet array 400 and protrude beyond the magnet array 400 in the first direction (+Z direction) and second direction (−Z direction). Referring to FIG. 20C, the shielding member 800 may surround at least a portion of the sixth surface 410*b* of the magnet array 400 and at least a portion of the ninth surface 410*c*. Referring to FIG. 20D, the shielding member 800 may surround at least a portion of the sixth surface 410*b* of the magnet array 400 and at least a portion of the tenth surface 410*d*. The magnitude of the magnetic field formed by the magnet array 400 and transferred to the inside (e.g., −X direction) of the electronic device 101 may be reduced by the shielding member 800.

Although the shielding member 800 disposed on the first magnet array (e.g., the first magnet array 410 of FIGS. 16A, and 16B) has been described in connection with FIGS. 20A, 20B, 20C, and 20D, the foregoing description may also be applicable to the shielding member 800 disposed on the second magnet array (e.g., the second magnet array 420 of FIGS. 16A, and 16B).

According to various embodiments, the shielding member 800 may be formed of a magnetic material. For example, the shielding member 800 may include at least one of ferritic stainless steel (e.g., stainless steel 430) or martensitic stainless steel (e.g., stainless steel).

According to various embodiments of the disclosure, an electronic device (e.g., the electronic device 101 of FIG. 2) may comprise a foldable housing (e.g., the foldable housing 300 of FIG. 2) including a hinge structure (e.g., the hinge structure 302 of FIG. 4), the foldable housing including a first housing (e.g., the first housing 310 of FIG. 2) connected to the hinge structure and including a first surface (e.g., the first surface 310*a* of FIG. 2) facing in a first direction, a second surface (e.g., the second surface 310*b* of FIG. 2) facing in a second direction opposite to the first direction, and a first side surface (e.g., the first side surface 311*a* of FIG. 2) surrounding at least a portion between the first surface and the second surface and a second housing (e.g., the second housing 320 of FIG. 2) connected to the hinge structure and including a third surface (e.g., the third surface 320*a* of FIG. 2) facing in a third direction, a fourth surface (e.g., the fourth surface 320*b* of FIG. 2) facing in a fourth direction opposite to the third direction, and a second side surface (e.g., the second side surface 321*a* of FIG. 2) surrounding at least a portion between the third surface and the fourth surface, in a folded state, the first surface facing the third surface and, in an unfolded state, the third direction being the same as the first direction, a flexible display (e.g., the flexible display 200 of FIG. 2) extending from the first surface to the third surface, and a magnet array (e.g., the magnet array 400 of FIG. 5) including a plurality of magnets in a three-dimensional multipolar magnetic array, the magnet array including a first magnet array (e.g., the first magnet array 410 of FIG. 8) disposed in the first housing and a second magnet array (e.g., the second magnet array 420 of FIG. 8) disposed in the second housing. In the folded state, the first magnet array may correspond to the second magnet array.

According to various embodiments, the first magnet array may be disposed on an edge of the first housing, and the second magnet array may be disposed on an edge of the second housing. According to various embodiments, the first magnet array may include at least one 1-1th magnet (e.g., the 1-1th magnet 411 of FIG. 12A) forming a 1-1th magnetic field (e.g., the 1-1th magnetic field 411*a* of FIG. 12A) in a direction towards the first surface, at least one 1-2th magnet (e.g., the 1-2th magnet 412 of FIG. 12A) forming a 1-2th magnetic field (e.g., the 1-2th magnetic field 412*a* of FIG. 12A) in a direction towards the second surface, at least one 1-3th magnet (e.g., the 1-3th magnet 413 of FIG. 12A) disposed between the 1-1th magnet and the 1-2th magnet and forming a 1-3th magnetic field (e.g., the 1-3th magnetic field 413*a* of FIG. 12A) in a direction towards an end in a sixth direction (e.g., the sixth direction (−Y direction) of FIG. 12A) of the first magnet array, and at least one 1-4th magnet (e.g., the 1-4th magnetic field 414*a* of FIG. 12A) disposed between the 1-1th magnet and the 1-2th magnet and forming a 1-4th magnetic field (e.g., the 1-4th magnetic field 414*a* of FIG. 12A) in a direction towards an end in a fifth direction (e.g., the fifth direction (+Y direction) of FIG. 12A) of the first magnet array. The second magnet array may include at least one 2-1th magnet (e.g., the 2-1th magnet 421 of FIG. 12B) forming a 2-1th magnetic field (e.g., the 2-1th magnetic field 421*a* of FIG. 12B) in a direction towards the fourth surface, at least one 2-2th magnet (e.g., the 2-2th magnet 422 of FIG. 12B) forming a 2-2th magnetic field (e.g., the 2-2th magnetic field 422*a* of FIG. 12B) in a direction towards the third surface, at least one 2-3th magnet (e.g., the 2-3th magnet 423 of FIG. 12B) disposed between the 2-1th magnet and the 2-2th magnet and forming a 2-3th magnetic field (e.g., the 2-3th magnetic field 423*a* of FIG. 12B) in a direction in a direction towards the end in the sixth direction of the second magnet array, and at least one 2-4th magnet (e.g., the 2-4th magnet 424 of FIG. 12B) disposed between the 2-1th magnet and the 2-2th magnet and forming a 2-4th magnetic field (e.g., the 2-4th magnetic field 424*a* of FIG. 12B) in a direction towards the end in the fifth direction of the second magnet array.

According to various embodiments, the electronic device may further comprise a guide member (e.g., the guide member 700 of FIG. 14) including a first guide member (e.g., the first guide member 710 of FIG. 16A) disposed on at least a portion of the 1-1th magnet and the 1-2th magnet and a second guide member (e.g., the second guide member 720 of FIG. 16B) disposed on at least a portion of the 2-1th magnet and the 2-2th magnet.

According to various embodiments, in the folded state, the 1-1th magnet corresponds to the 2-1th magnet, the 1-2th magnet may correspond to the 2-2th magnet, the 1-3th magnet corresponds to the 2-4th magnet, and the 1-4th magnet may correspond to the 2-3th magnet.

According to various embodiments, the 1-1th magnet may be configured to transfer the 1-1th magnetic field to the first surface at a first designated angle (e.g., the first designated angle θ1 of FIGS. 16A, and 16B), and the 2-1th magnet may be configured to transfer the 2-1th magnetic field to the third surface at a second designated angle (e.g., the second designated angle θ2 of FIGS. 16A, and 16B).

According to various embodiments, the first side surface may be perpendicular to the first direction or the second direction, and the second side surface may be perpendicular to the third direction or the fourth direction. The first magnet array may include a fifth surface (e.g., the fifth surface 410*a* of FIGS. 16A, and 16B) towards the first side surface and a sixth surface (e.g., the sixth surface 410*b* of FIGS. 16A, and 16B) opposite to the fifth surface, and the second magnet array may include a seventh surface (e.g., the seventh surface 420*a* of FIGS. 16A, and 16B) towards the second side surface and an eighth surface (e.g., the eighth surface 420*b* of FIGS. 16A, and 16B) opposite to the seventh surface. The electronic device may further comprise a guide member (e.g., the guide member 700 of FIG. 14) including a first guide member (e.g., the first guide member 710 of FIG. 16A) disposed on the fifth surface and a second guide member (e.g., the second guide member 720 of FIG. 16B) disposed on the seventh surface.

According to various embodiments, the electronic device may further comprise a shielding member (e.g., the shielding member 800 of FIGS. 17A to 17C) disposed on at least a portion of the sixth surface and at least a portion of the eighth surface.

According to various embodiments, the shielding member may include a first shielding member surrounding at least a portion between the fifth surface and the sixth surface of the first magnet array and a second shielding member surrounding at least a portion between the seventh surface and the eighth surface of the second magnet array.

According to various embodiments, the electronic device may further comprise a pen driving circuit (e.g., the pen driving circuit 500 of FIG. 5) disposed under the flexible display.

According to various embodiments, the first side surface may be perpendicular to the first direction or the second direction, and the second side surface may be perpendicular to the third direction or the fourth direction. The electronic device may further comprise a guide member (e.g., the guide member 700 of FIG. 14) including a first guide member (e.g., the first guide member 710 of FIG. 14) disposed between the first side surface and the first magnet array disposed along the first side surface and a second guide member (e.g., the second guide member 720 of FIG. 14) disposed between the second side surface and the second magnet array disposed along the second side surface.

According to various embodiments, the first magnet array may include a 1-1th magnet array (e.g., the 1-1th magnet array 416 of FIG. 10) and a 1-2th magnet array (e.g., the 1-2th magnet array 418 of FIG. 10) disposed along the first side surface, and the second magnet array may include a 2-1th magnet array (e.g., the 2-1th magnet array 426 of FIG. 10) and a 2-2th magnet array (e.g., the 2-2th magnet array 428 of FIG. 10) disposed along the second side surface. In the folded state, the 1-1th magnet array and the 2-1th magnet array may overlap each other, and the 1-2th magnet array and the 2-2th magnet array may overlap each other.

According to various embodiments, the first magnet array may include a 1-1th magnet array (e.g., the 1-1th magnet array 416 of FIG. 11) arranged along the first side surface, and the second magnet array may include a 2-1th magnet array (e.g., the 2-1th magnet array 426 of FIG. 11) and a 2-2th magnet array (e.g., the 2-2th magnet array 428 of FIG. 11) arranged along the second side surface. In the folded state, the 1-1th magnet array and the 2-1th magnet array may overlap each other. The electronic device may further comprise a magnetic substance (e.g., the magnetic substance 600 of FIG. 11) disposed in the first housing structure and overlapping at least a portion of the 2-2th magnet array in the folded state of at least a portion thereof.

According to various embodiments, the electronic device may further comprise a guide member (e.g., the guide member 700 of FIG. 14) disposed on the magnet array. The guide member may include a ferritic stainless steel or a martensitic stainless steel.

According to various embodiments, the magnet array may include a plurality of end magnets (e.g., the end magnets 402 of FIG. 13) forming two opposite ends of the magnet array and a plurality of center magnets (e.g., the center magnets 404 of FIG. 13) disposed between the end magnets. A second width d2 of the center magnets may be larger than a first width d1 of the end magnets.

According to various embodiments of the disclosure, an electronic device (e.g., the electronic device 101 of FIG. 2) may comprise a foldable housing (e.g., the foldable housing 300 of FIG. 2) including a hinge structure (e.g., the hinge structure 302 of FIG. 4) and including a first housing structure (e.g., the first housing 310 of FIG. 2) connected to the hinge structure and a second housing (e.g., the second housing 320 of FIG. 2) connected to the hinge structure and rotatable about the hinge structure from the first housing, a flexible display (e.g., the flexible display 200 of FIG. 2) extending from the first housing to the second housing, and a plurality of magnets in a three-dimensional multipolar magnetic array and a second magnet array (e.g., the second magnet array 420 of FIG. 7) disposed in the first housing, a magnetic substance (e.g., the magnetic substance 600 of FIG. 11) disposed in the first housing and having at least a portion facing at least a portion of the second magnet array in a folded state of the electronic device, and a guide member (e.g., the guide member 700 of FIG. 14) disposed on the second magnet array.

According to various embodiments, the first housing may include a second side member (e.g., the second side member 321 of FIG. 14) including a third surface (e.g., the third surface 320*a* of FIG. 2) facing in a third direction, a fourth surface (e.g., the fourth surface 320*b* of FIG. 2) facing in a fourth direction opposite to the third direction, and a second side surface (e.g., the second side surface 321*a* of FIG. 14) surrounding at least a portion between the third surface and the fourth surface and including a second side surface (e.g., the second side surface 321*a* of FIG. 14) perpendicular to the third direction. The second magnet array may include a seventh surface (e.g., the fifth surface 410*a* of FIG. 14) facing the second side surface. The guide member may be disposed on the seventh surface.

According to various embodiments, the second magnet array may include at least one 2-1th magnet (e.g., the 2-1th magnet 421 of FIG. 12B) forming a 2-1th magnetic field (e.g., the 2-1th magnetic field 421*a* of FIG. 12B) facing the fourth surface, at least one 2-2th magnet (e.g., the 2-2th magnet 422 of FIG. 12B) forming a 2-2th magnetic field (e.g., the 2-2th magnetic field 422*a* of FIG. 12B) facing the fourth surface, at least one 2-3th magnet (e.g., the 2-3th magnet 423 of FIG. 12B) forming a 2-3th magnetic field (e.g., the 2-3th magnetic field 423*a* of FIG. 12B) facing in the sixth direction (e.g., the sixth direction (−Y direction) of FIG. 12B) of the second magnet array and disposed between the 2-1th magnet and the 2-2th magnet, and at least one 2-4th magnet (e.g., the 2-4th magnet 424 of FIG. 12B) forming a 2-4th magnetic field (e.g., the 2-4th magnetic field 424a of FIG. 12B) facing in the fifth direction (e.g., the fifth direction (+Y direction)) of the second magnet array and disposed between the 2-1th magnet and the 2-2th magnet.

According to various embodiments, the electronic device may further comprise a first magnet array (e.g., the first magnet array 410 of FIG. 11) including a plurality of magnets in the three-dimensional multipolar magnetic array and disposed in the first housing. The second magnet array may include a 2-1th magnet array (e.g., the 2-1th magnet array 426 of FIG. 11) and a 2-2th magnet array (e.g., the 2-2th magnet array 428 of FIG. 11) arranged along the second side surface. In the folded state, at least a portion of the 2-2th magnet array may overlap at least a portion of the magnetic substance, and at least a portion of the 2-1th magnet array may overlap at least a portion of the first magnet array.

According to various embodiments, the electronic device may further comprise a key input device (e.g., the key input device 340 of FIG. 11) configured to obtain the user's input. The magnetic substance may be a side supporting member supporting the key input device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
    a foldable housing comprising:
        a hinge structure,
        a first housing connected to the hinge structure, the first housing including:
            a first surface facing in a first direction;
            a second surface facing in a second direction opposite to the first direction; and
            a first side surface surrounding at least a portion between the first surface and the second surface, and
        a second housing connected to the hinge structure, the second housing including:
            a third surface facing in a third direction;
            a fourth surface facing in a fourth direction opposite to the third direction; and
            a second side surface surrounding at least a portion between the third surface and the fourth surface, in a folded state, the first surface facing the third surface and, in an unfolded state, the third direction being a same direction as the first direction and the fourth direction being a same direction as the second direction;
    a flexible display extending from the first surface to the third surface;
    a magnet array comprising a plurality of magnets in a three-dimensional multipolar magnetic array, the magnet array including a first magnet array disposed on an edge of the first housing and a second magnet array disposed on an edge of the second housing;
    a first guide member disposed between the first side surface of the first housing and the first magnet array and configured to guide a magnetic field formed by the first magnet array toward the first side surface of the first housing; and
    a second guide member disposed between the second side surface of the second housing and the second magnet array and configured to guide a magnetic field formed by the second magnet array toward the second side surface of the second housing,
    wherein, in the folded state, the first magnet array corresponds to the second magnet array.

2. The electronic device of claim 1,
    wherein the first guide member protrudes from the first magnet array in the first direction, and
    wherein the second guide member protrudes from the second magnet array in the third direction.

3. The electronic device of claim 1,
    wherein the first magnet array comprises:
        at least one 1-1th magnet forming a 1-1th magnetic field towards the first surface;
        at least one 1-2th magnet forming a 1-2th magnetic field towards the second surface;
        at least one 1-3th magnet disposed between the 1-1th magnet and the 1-2th magnet and forming a 1-3th magnetic field towards an end in a sixth direction of the first magnet array; and
        at least one 1-4th magnet disposed between the 1-1th magnet and the 1-2th magnet and forming a 1-4th magnetic field towards an end in a fifth direction of the first magnet array, and
    wherein the second magnet array comprises:
        at least one 2-1th magnet forming a 2-1th magnetic field towards the fourth surface;
        at least one 2-2th magnet forming a 2-2th magnetic field towards the third surface;
        at least one 2-3th magnet disposed between the 2-1th magnet and the 2-2th magnet and forming a 2-3th magnetic field towards the end in the sixth direction of the second magnet array; and
        at least one 2-4th magnet disposed between the 2-1th magnet and the 2-2th magnet and forming a 2-4th magnetic field towards the end in the fifth direction of the second magnet array.

4. The electronic device of claim 3, wherein in the folded state, the 1-1th magnet corresponds to the 2-1th magnet, the 1-2th magnet corresponds to the 2-2th magnet, the 1-3th magnet corresponds to the 2-4th magnet, and the 1-4th magnet corresponds to the 2-3th magnet.

5. The electronic device of claim 3,
    wherein the 1-1th magnet is configured to transfer the 1-1th magnetic field to the first surface at a first designated angle, and
    wherein the 2-1th magnet is configured to transfer the 2-1th magnetic field to the third surface at a second designated angle.

6. The electronic device of claim 1,
    wherein the first side surface is perpendicular to the first direction or the second direction,
    wherein the second side surface is perpendicular to the third direction or the fourth direction,
    wherein the first magnet array comprises a fifth surface towards the first side surface and a sixth surface opposite to the fifth surface, and
    wherein the second magnet array comprises a seventh surface towards the second side surface and an eighth surface opposite to the seventh surface.

7. The electronic device of claim 6, further comprising:
a shielding member disposed on at least a portion of the sixth surface and at least a portion of the eighth surface.

8. The electronic device of claim 7, wherein the shielding member comprises a first shielding member surrounding at least a portion between the fifth surface and the sixth surface of the first magnet array and a second shielding member surrounding at least a portion between the seventh surface and the eighth surface of the second magnet array.

9. The electronic device of claim 1, further comprising:
a pen driving circuit disposed under the flexible display.

10. The electronic device of claim 1,
wherein the first side surface is perpendicular to the first direction or the second direction,
wherein the second side surface is perpendicular to the third direction or the fourth direction,
wherein the first guide member is disposed between the first side surface and the first magnet array disposed along the first side surface, and
wherein the second guide member is disposed between the second side surface and the second magnet array disposed along the second side surface.

11. The electronic device of claim 10,
wherein the first magnet array comprises a 1-1th magnet array and a 1-2th magnet array disposed along the first side surface,
wherein the second magnet array includes a 2-1th magnet array and a 2-2th magnet array disposed along the second side surface, and
wherein, in the folded state, the 1-1th magnet array and the 2-1th magnet array overlap each other and the 1-2th magnet array and the 2-2th magnet array overlap each other.

12. The electronic device of claim 10,
wherein the first magnet array comprises a 1-1th magnet array arranged along the first side surface,
wherein the second magnet array comprises a 2-1th magnet array and a 2-2th magnet array arranged along the second side surface,
wherein, in the folded state, the 1-1th magnet array and the 2-1th magnet array overlap each other, and
wherein the electronic device further comprises:
a magnetic substance disposed in the first housing and overlapping at least a portion of the 2-2th magnet array in the folded state of at least a portion thereof.

13. The electronic device of claim 1, wherein at least one of the first guide member or the second guide member comprises one of a ferritic stainless steel or a martensitic stainless steel.

14. The electronic device of claim 1,
wherein the magnet array comprises a plurality of end magnets forming two opposite ends of the magnet array and a plurality of center magnets disposed between the plurality of end magnets, and
wherein a second width of the plurality of center magnets is larger than a first width of the plurality of end magnets.

15. The electronic device of claim 14,
wherein the three-dimensional multipolar magnetic array includes a Halbach array, and
wherein the plurality of end magnets and the plurality of center magnets form various magnetic field directions in which a direction of the magnetic field formed by the plurality of end magnets is perpendicular to or opposite from a direction of the magnetic field formed by the plurality of center magnets.

16. The electronic device of claim 1, wherein the magnet array is configured to reduce a gap between the first housing and the second housing when the electronic device is in the folded state.

17. The electronic device of claim 16, wherein the first magnet array and the second magnet array are configured to form magnetic fields that are directed substantially in a same direction such that the first housing and the second housing obtain an attractive force.

18. The electronic device of claim 1, wherein at least a portion of the magnet array is disposed under the flexible display.

19. The electronic device of claim 1,
wherein the magnet array comprises a plurality of end magnets forming two opposite ends of the magnet array and a plurality of center magnets disposed between the plurality of end magnets such that there is no space between the plurality of end magnets and the plurality of center magnets, and
wherein at least a first one of the plurality of center magnets forms a magnetic field in a direction opposite to a magnetic field formed by the plurality of end magnets and at least a second one of the plurality of center magnets forms a magnetic field in a direction perpendicular to the magnetic field formed by the first one of the plurality of center magnets and the magnetic field formed by the plurality of end magnets.

20. The electronic device claim 1,
wherein the first guide member covers a portion of the first magnet array and extends up to a virtual boundary dividing a north pole and a south pole of the first magnet array to cover an area of the north pole and an area of the south pole of the first magnet array, and
wherein the second guide member covers a portion of the second magnet array and extends up to a virtual boundary dividing a north pole and a south pole of the second magnet array to cover an area of the north pole and an area of the south pole of the second magnet array.

* * * * *